(12) United States Patent
Tateishi et al.

(10) Patent No.: US 9,100,372 B2
(45) Date of Patent: Aug. 4, 2015

(54) SYSTEM FOR DETERMINING WHETHER OR NOT AUTOMATON SATISFIES CONTEXT-FREE GRAMMAR

(71) Applicant: International Business Machines Corporation, Armonk, NY (US)

(72) Inventors: Takaaki Tateishi, Kanagawa-ken (JP); Yuji Watanabe, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 13/900,771

(22) Filed: May 23, 2013

(65) Prior Publication Data

US 2013/0332731 A1    Dec. 12, 2013

(30) Foreign Application Priority Data

May 25, 2012 (JP) ................ 2012-119545

(51) Int. Cl.
*H04L 29/00* (2006.01)
*H04L 29/06* (2006.01)
*G06F 17/30* (2006.01)
*G06F 21/55* (2013.01)
*G06F 17/27* (2006.01)

(52) U.S. Cl.
CPC .......... *H04L 63/0428* (2013.01); *G06F 17/271* (2013.01); *G06F 17/30985* (2013.01); *G06F 21/554* (2013.01)

(58) Field of Classification Search
CPC ............ G06F 17/30985; G06F 21/554; G06F 17/271; H04L 63/0428; H04L 29/06
USPC .................. 726/1; 713/1, 168, 189, 191
See application file for complete search history.

(56) References Cited

U.S. PATENT DOCUMENTS

| 7,962,323 | B2 * | 6/2011 | Johnson et al. .................. 704/1 |
| 2003/0074184 | A1 * | 4/2003 | Hayosh et al. .................. 704/1 |
| 2006/0095264 | A1 * | 5/2006 | Wu et al. ..................... 704/260 |
| 2008/0320452 | A1 * | 12/2008 | Thompson .................. 717/136 |
| 2012/0046939 | A1 * | 2/2012 | Mohri et al. .................... 704/9 |

FOREIGN PATENT DOCUMENTS

JP    2009151757 A    7/2009

OTHER PUBLICATIONS

Freedman et al., "Efficient Private Matching and Set Intersection", Advances in Cryptology EUROCRYPT 2004, Lecture Notes in Computer Science, 2004.

* cited by examiner

*Primary Examiner* — Mohammad A Siddiqi
(74) *Attorney, Agent, or Firm* — Vazken Alexanian

(57) ABSTRACT

A server that holds context-free grammar and is connectable to a client that holds an automaton. The server compares an edge pair with an encrypted string value such that the encrypted string value is hidden from the client. The edge pair represents a string for an encrypted value in which a nonfinal character is made to correspond to a state before and the state after held by the client and an encrypted string value represents a string for an encrypted value in which each of a plurality of nonfinal characters contained in a substituted symbol string for a production rule for the context-free grammar is given correspondence with an assigned state before and state after. The encrypted value in which in which the encrypted string value matches the edge pair has been encrypted is sent to the client along with the state before and state after that has been assigned.

18 Claims, 26 Drawing Sheets

State before, State after, Input character

$$( \quad q_0 \quad , \quad q_1 \quad , \quad 0 \quad )$$

$$( \quad q_1 \quad , \quad q_2 \quad , \quad 1 \quad )$$

$$( \quad q_2 \quad , \quad q_3 \quad , \quad 0 \quad )$$

| State before, | State after, | Substitution symbol | Encrypted value |
|---|---|---|---|
| $q_0$ | $q_0$ | A | $A[q_0, q_0]$ |
| $q_1$ | $q_1$ | A | $A[q_1, q_1]$ |
| $q_2$ | $q_2$ | A | $A[q_2, q_2]$ |
| $q_3$ | $q_3$ | A | $A[q_3, q_3]$ |
| $q_0$ | $q_0$ | B | $B[q_0, q_0]$ |
| $q_1$ | $q_1$ | B | $B[q_1, q_1]$ |
| $q_2$ | $q_2$ | B | $B[q_2, q_2]$ |
| $q_3$ | $q_3$ | B | $B[q_3, q_3]$ |

↑ Encryption S23

↑ Expansion S22

Null character production rules $A \to \varepsilon$ $B \to \varepsilon$

FIG. 10

| Production rule | Substitution symbol | | Substituted symbol string |
|---|---|---|---|
| | $(q_0, q_1, B)$ | → | $(q_0, q_2, D)(q_2, q_1, C)$ |
| | $(q_0, q_1, B)$ | → | $(q_0, q_3, D)(q_3, q_1, C)$ |
| | $(q_0, q_2, B)$ | → | $(q_0, q_1, D)(q_1, q_2, C)$ |
| | $(q_0, q_2, B)$ | → | $(q_0, q_3, D)(q_3, q_2, C)$ |
| | $(q_0, q_3, B)$ | → | $(q_0, q_1, D)(q_1, q_3, C)$ |
| | $(q_0, q_3, B)$ | → | $(q_0, q_2, D)(q_2, q_3, C)$ |
| | $(q_1, q_0, B)$ | → | $(q_1, q_2, D)(q_2, q_0, C)$ |
| | $(q_1, q_0, B)$ | → | $(q_1, q_3, D)(q_3, q_0, C)$ |
| | $(q_1, q_2, B)$ | → | $(q_1, q_0, D)(q_0, q_2, C)$ |
| | $(q_1, q_2, B)$ | → | $(q_1, q_3, D)(q_3, q_2, C)$ |
| $B \rightarrow D\ C$  | $(q_1, q_3, B)$ | → | $(q_1, q_0, D)(q_0, q_3, C)$ |
| | $(q_1, q_3, B)$ | → | $(q_1, q_2, D)(q_2, q_3, C)$ |
| | $(q_2, q_0, B)$ | → | $(q_2, q_1, D)(q_1, q_0, C)$ |
| | $(q_2, q_0, B)$ | → | $(q_2, q_3, D)(q_3, q_0, C)$ |
| | $(q_2, q_1, B)$ | → | $(q_2, q_0, D)(q_0, q_1, C)$ |
| | $(q_2, q_1, B)$ | → | $(q_2, q_3, D)(q_3, q_1, C)$ |
| | $(q_2, q_3, B)$ | → | $(q_2, q_0, D)(q_0, q_3, C)$ |
| | $(q_2, q_3, B)$ | → | $(q_2, q_1, D)(q_1, q_3, C)$ |
| | $(q_3, q_0, B)$ | → | $(q_3, q_1, D)(q_1, q_0, C)$ |
| | $(q_3, q_0, B)$ | → | $(q_3, q_2, D)(q_2, q_0, C)$ |
| | $(q_3, q_1, B)$ | → | $(q_3, q_0, D)(q_0, q_1, C)$ |
| | $(q_3, q_1, B)$ | → | $(q_3, q_2, D)(q_2, q_1, C)$ |
| | $(q_3, q_2, B)$ | → | $(q_3, q_0, D)(q_0, q_2, C)$ |
| | $(q_3, q_2, B)$ | → | $(q_3, q_1, D)(q_1, q_2, C)$ |

FIG. 21

| Substituted symbol string | Encrypted string |
|---|---|
| $(q_0, q_2, D) (q_2, q_1, C)$ | $D\_g(q_0, q_2, q_1, D[q_0, q_2], C[q_2, q_1])$ |
| $(q_0, q_3, D) (q_3, q_1, C)$ | $D\_g(q_0, q_3, q_1, D[q_0, q_3], C[q_3, q_1])$ |
| $(q_0, q_1, D) (q_1, q_2, C)$ | $D\_g(q_0, q_1, q_2, D[q_0, q_1], C[q_1, q_2])$ |
| $(q_0, q_3, D) (q_3, q_2, C)$ | $D\_g(q_0, q_3, q_2, D[q_0, q_3], C[q_3, q_2])$ |
| $(q_0, q_1, D) (q_1, q_3, C)$ | $D\_g(q_0, q_1, q_3, D[q_0, q_1], C[q_1, q_3])$ |
| $(q_0, q_2, D) (q_2, q_3, C)$ | $D\_g(q_0, q_2, q_3, D[q_0, q_2], C[q_2, q_3])$ |
| $(q_1, q_2, D) (q_2, q_0, C)$ | $D\_g(q_1, q_2, q_0, D[q_1, q_2], C[q_2, q_0])$ |
| $(q_1, q_3, D) (q_3, q_0, C)$ | $D\_g(q_1, q_3, q_0, D[q_1, q_3], C[q_3, q_0])$ |
| $(q_1, q_0, D) (q_0, q_2, C)$ | $D\_g(q_1, q_0, q_2, D[q_1, q_0], C[q_0, q_2])$ |
| $(q_1, q_3, D) (q_3, q_2, C)$ | $D\_g(q_1, q_3, q_2, D[q_1, q_3], C[q_3, q_2])$ |
| $(q_1, q_0, D) (q_0, q_3, C)$ | $D\_g(q_1, q_0, q_3, D[q_1, q_0], C[q_0, q_3])$ |
| $(q_1, q_2, D) (q_2, q_3, C)$ | $D\_g(q_1, q_2, q_3, D[q_1, q_2], C[q_2, q_3])$ |
| $(q_2, q_1, D) (q_1, q_0, C)$ | $D\_g(q_2, q_1, q_0, D[q_2, q_1], C[q_1, q_0])$ |
| $(q_2, q_3, D) (q_3, q_0, C)$ | $D\_g(q_2, q_3, q_0, D[q_2, q_3], C[q_3, q_0])$ |
| $(q_2, q_0, D) (q_0, q_1, C)$ | $D\_g(q_2, q_0, q_1, D[q_2, q_0], C[q_0, q_1])$ |
| $(q_2, q_3, D) (q_3, q_1, C)$ | $D\_g(q_2, q_3, q_1, D[q_2, q_3], C[q_3, q_1])$ |
| $(q_2, q_0, D) (q_0, q_3, C)$ | $D\_g(q_2, q_0, q_3, D[q_2, q_0], C[q_0, q_3])$ |
| $(q_2, q_1, D) (q_1, q_3, C)$ | $D\_g(q_2, q_1, q_3, D[q_2, q_1], C[q_1, q_3])$ |
| $(q_3, q_1, D) (q_1, q_0, C)$ | $D\_g(q_3, q_1, q_0, D[q_3, q_1], C[q_1, q_0])$ |
| $(q_3, q_2, D) (q_2, q_0, C)$ | $D\_g(q_3, q_2, q_0, D[q_3, q_2], C[q_2, q_0])$ |
| $(q_3, q_0, D) (q_0, q_1, C)$ | $D\_g(q_3, q_0, q_1, D[q_3, q_0], C[q_0, q_1])$ |
| $(q_3, q_2, D) (q_2, q_1, C)$ | $D\_g(q_3, q_2, q_1, D[q_3, q_2], C[q_2, q_1])$ |
| $(q_3, q_0, D) (q_0, q_2, C)$ | $D\_g(q_3, q_0, q_2, D[q_3, q_0], C[q_0, q_2])$ |
| $(q_3, q_1, D) (q_1, q_2, C)$ | $D\_g(q_3, q_1, q_2, D[q_3, q_1], C[q_1, q_2])$ |

S44 Formation of scalar value

FIG. 22

| Edge pair | Edge pair formed into scalar value |
|---|---|
| $A[q_0, q_0], B[q_0, q_0]$ | $D\_a(q_0, q_0, q_0, A[q_0, q_0], B[q_0, q_0])$ |
| $B[q_0, q_0], A[q_0, q_0]$ | $D\_a(q_0, q_0, q_0, B[q_0, q_0], A[q_0, q_0])$ |
| $A[q_0, q_0], C[q_0, q_1]$ | $D\_a(q_0, q_0, q_1, A[q_0, q_0], C[q_0, q_1])$ |
| $B[q_0, q_0], C[q_0, q_1]$ | $D\_a(q_0, q_0, q_1, B[q_0, q_0], C[q_0, q_1])$ |
| $C[q_0, q_1], A[q_1, q_1]$ | $D\_a(q_0, q_1, q_1, C[q_0, q_1], A[q_1, q_1])$ |
| $C[q_0, q_1], B[q_1, q_1]$ | $D\_a(q_0, q_1, q_1, C[q_0, q_1], B[q_1, q_1])$ |
| $A[q_1, q_1], B[q_1, q_1]$ | $D\_a(q_1, q_1, q_1, A[q_1, q_1], B[q_1, q_1])$ |
| $B[q_1, q_1], A[q_1, q_1]$ | $D\_a(q_1, q_1, q_1, B[q_1, q_1], A[q_1, q_1])$ |
| $A[q_1, q_1], D[q_1, q_2]$ | $D\_a(q_1, q_1, q_2, A[q_1, q_1], D[q_1, q_2])$ |
| $B[q_1, q_1], D[q_1, q_2]$ | $D\_a(q_1, q_1, q_2, B[q_1, q_1], D[q_1, q_2])$ |
| $D[q_1, q_2], A[q_2, q_2]$ | $D\_a(q_1, q_2, q_2, D[q_1, q_2], A[q_2, q_2])$ |
| $D[q_1, q_2], B[q_2, q_2]$ | $D\_a(q_1, q_2, q_2, D[q_1, q_2], B[q_2, q_2])$ |
| $A[q_2, q_2], B[q_2, q_2]$ | $D\_a(q_2, q_2, q_2, A[q_2, q_2], B[q_2, q_2])$ |
| $B[q_2, q_2], A[q_2, q_2]$ | $D\_a(q_2, q_2, q_2, B[q_2, q_2], A[q_2, q_2])$ |
| $A[q_2, q_2], D[q_2, q_3]$ | $D\_a(q_2, q_2, q_3, A[q_2, q_2], D[q_2, q_3])$ |
| $B[q_2, q_2], D[q_2, q_3]$ | $D\_a(q_2, q_2, q_3, B[q_2, q_2], D[q_2, q_3])$ |
| $D[q_2, q_3], A[q_3, q_3]$ | $D\_a(q_2, q_3, q_3, D[q_2, q_3], A[q_3, q_3])$ |
| $D[q_2, q_3], B[q_3, q_3]$ | $D\_a(q_2, q_3, q_3, D[q_2, q_3], B[q_3, q_3])$ |
| $A[q_3, q_3], B[q_3, q_3]$ | $D\_a(q_3, q_3, q_3, A[q_3, q_3], B[q_3, q_3])$ |
| $B[q_3, q_3], A[q_3, q_3]$ | $D\_a(q_3, q_3, q_3, B[q_3, q_3], A[q_3, q_3])$ |

S45 Formation of scalar value

FIG. 24

SYSTEM FOR DETERMINING WHETHER OR NOT AUTOMATON SATISFIES CONTEXT-FREE GRAMMAR

CROSS-REFERENCE TO RELATED APPLICATION

This application claims priority under 35 U.S.C. §119 from Japanese Patent Application No. 2012119545 filed May 25, 2012, the entire contents of which are incorporated herein by reference.

BACKGROUND OF THE INVENTION

The present invention relates to a server, client, method, and program for determining whether or not an automaton satisfies context-free grammar.

The invention describes a system for authenticating whether or not a string held by a client is accepted by an automaton held by a server are known. For example, see Laid-open Patent Publication No. 2009-151757

SUMMARY OF THE INVENTION

When the client holds the automaton and the server holds context-free grammar, determining whether or not the automaton satisfies the context-free grammar is extremely difficult in a state where the automaton is hidden to the server and the context-free grammar is hidden to the client.

Accordingly, an aspect of the present invention is a server that holds context-free grammar and is connectable to a client that holds an automaton. Provided is a server that compares an edge pair with an encrypted string value such that the encrypted string value is hidden from the client. The edge pair represents a string for an encrypted value in which a nonfinal character is made to correspond to a state before and a state after held by the client and the encrypted string value that represents a string for an encrypted value in which each of a plurality of nonfinal characters contained in a substituted symbol string for a production rule for the context-free grammar is given correspondence with an assigned state before and state after. The encrypted value in which the substitution symbol for a production rule in which the encrypted string value matches the edge pair is encrypted with correspondence made with the state before and state after that have been assigned is sent to the client along with the assigned state before and state after. Also provided is a program for making a computer function as this server.

An embodiment of the present invention is a client that holds an automaton and is connectable to the server of the first embodiment. Provided is client that compares the edge pair and encrypted string value such that the edge pair is hidden from the server, and receives from the server the encrypted value in which the substitution symbol for the production rule in which the encrypted string value and the edge pair agree is encrypted with correspondence made with the state before and state after that have been assigned along with the state before and state after that have been assigned. Also provided is a program for making a computer function as this client.

Another aspect of the present invention is a method for determining whether the automaton satisfies the context-free grammar by a first computer holding the automaton and a second computer holding the context-free grammar. Provided is a method that compares an edge pair with an encrypted string value such that the encrypted string value is hidden from the second computer and also compared such that the edge pair is hidden from the second computer. The edge pair represents a string for an encrypted value in which a nonfinal character made to correspond with a state before and a state after held in the first computer and the encrypted string value that represents a string for an encrypted value in which each of a plurality of nonfinal characters contained in a substituted symbol string for a production rule for the context-free grammar is made to correspond to the assigned state before and state after and encrypted. The encrypted value in which the substitution symbol for a production rule in which the encrypted string value matches the edge pair has been encrypted is sent to the client along with the state before and state after that have been assigned.

Moreover, the summary of the invention above does not enumerate all of the required features of the present invention. In addition, sub-combinations of these feature groups can be in the invention.

BRIEF DESCRIPTION OF THE DRAWINGS

FIG. 10 shows an example of a substitution symbol for a production rule for which the substituted symbol string that is expanded in step S22 is the null character and an example of an encrypted value generated in step S23.

FIG. 21 shows an example of a production rule in which the substituted symbol string that is expanded in step S42 is a string of nonfinal characters.

FIG. 22 shows an example of an encrypted string value converted to a scalar value in step S44.

FIG. 24 shows an example of an edge pair converted to a scalar value in step S45.

DETAILED DESCRIPTION OF THE PREFERRED EMBODIMENTS

In the following, the present invention will be described through an embodiment of the invention, but the following embodiment does not limit invention in the scope of claims. In addition, all combinations of features described in the embodiment are not necessarily required for the solving means of the present invention.

Figure 1:
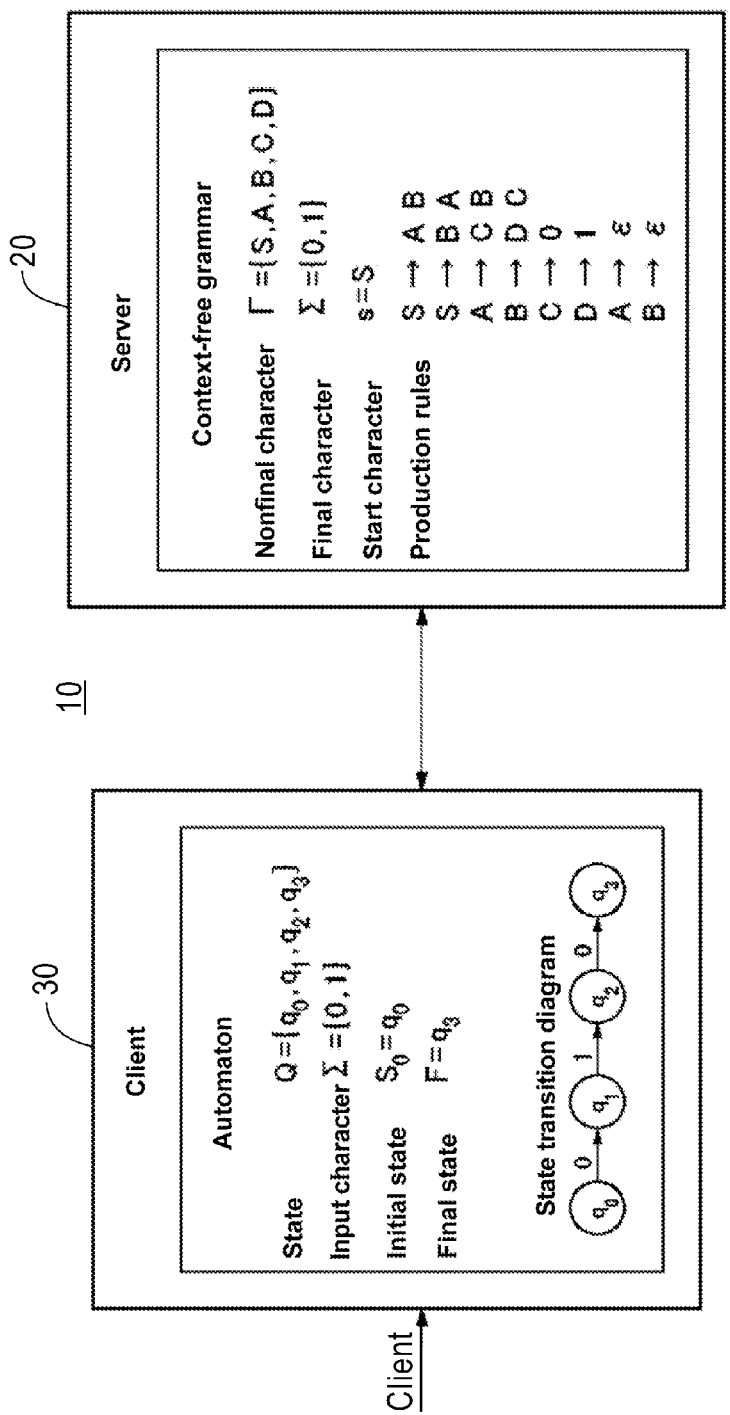
FIG. 1 shows the constitution of an authentication system 10 according to the present embodiment.

FIG. 1 shows the constitution of an authentication system 10 according to the present embodiment. The authentication system 10 according to the present embodiment is provided with a server 20 and a client 30. The server 20 and client 30 can be connected to each other via a network.

The server 20 holds context-free grammar. The client 30 holds an automaton. The client 30, for example, holds an automaton that represents a string input from the outside.

The authentication system 10 determines whether the automaton held by the client 30 satisfies the context-free grammar held by the server 20. In other words, the authentication system 10 determines whether or not various strings made to appear by the automaton held by the client 30 can be generated by the context-free grammar held by the server 20.

The automaton is defined by set Q of states, set $\Sigma$ of input characters, initial state S0, set F of final states, and state transitions such as state transition diagram, state transition table, or the like.

In the present embodiment, an example in which the client 30 holds and automaton that represents the string "010" will be described. In other words, in the present example, the set of states is $Q=\{q_0, q_1, q_2, q_3\}$ for the automaton held by the client 30; the set of input characters is $\Sigma=\{0, 1\}$, and the starting state is $S0=q_0$, and the set of final states is $F=\{q_3\}$. In addition, when "0" is input in the state $q_0$, this automaton transitions to the state $q_1$, transitions to the state $q_2$ when "1" is input in this state $q_0$, and transitions to the state $q_3$ when "0" is input in the state $q_2$.

Moreover, $q_0, q_1, q_2$, and $q_3$ are indices for identifying the state of the automaton. An example of $q_0, q_1, q_2$, and $q_3$ is unique numerical values for each state.

The context-free grammar is defined by the set $\Gamma$ of nonfinal characters, the set $\Sigma$ final characters, the starting character s, and a plurality of production rules.

In the present embodiment, an example in which the server 20 holds the context-free grammar, as is shown in FIG. 1 is described. In other words, in the present example, the context-free grammar held by the server 20 is the set of nonfinal characters $\Gamma=\{S, A, B, C, D\}$, is the set of final characters $\Sigma=\{0, 1\}$, and is the start character s=S. In addition, in the context-free grammar, the production rules are S→AB, S→BA, A→CB, B→DC, C→0, D→1, A→ϵ, B→ϵ. Moreover, ϵ represents the null character, in other words, the presence of no character.

Figure 2:
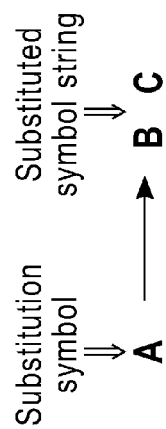
FIG. 2 shows an example of a production rule for context-free grammar held by a server 20.

FIG. 2 shows an example of a production rule for context-free grammar held by a server 20. In the production rules in the context-free grammar, the symbols to the left of the arrow which is left-hand term, represent the substitution symbols, and the symbols to the right of the arrow which is right-hand term, represent the substituted symbol string. In other words, in the production rules in the context-free grammar, the characters shown by the substitution symbol in the left-hand term are substituted with the string shown by the substituted symbol string in the right-hand term.

In the present embodiment, the server 20 holds context-free grammar in which the production rules are represented by Chomsky normal forms. In other words, in the present embodiment, a production rule that does not contain the null character ϵ is converted in the form of X→YZ or X→a. Here, X, Y, and Z represent any nonfinal character, and a represents an arbitrary final character. Moreover, when the server 20 a choirs context-free grammar for which the production rules are not in a Chomsky normal form, the production rules can be converted to the Chomsky normal form.

Figure 3:
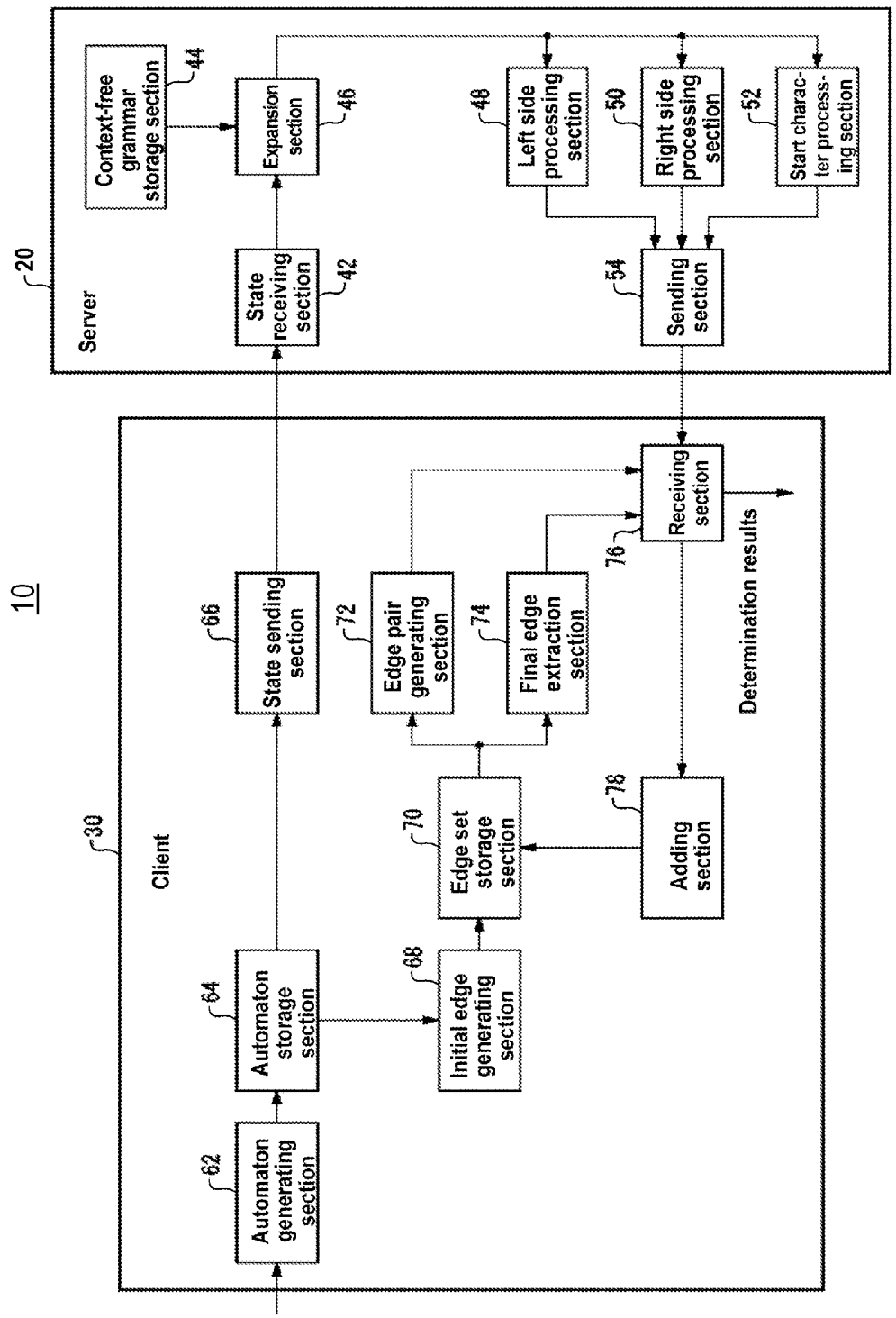
FIG. 3 shows a functional block configuration for the server 20 and a functional block configuration for a client 30 according to the present embodiment.

FIG. 3 shows a functional block configuration for the server 20 and a functional block configuration for a client 30 according to the present embodiment. The server 20 comprises a state receiving section 42, a context-free grammar storage section 44, an expansion section 46, a left-hand term processing section 48, a right-hand term processing section 50, a start character processing section 52, and a sending section 54. The client 30 comprises an automaton generating section 62, an automaton storage section 64, a state sending section 66, an initial edge generating section 68, and edge set storage section 70, an edge pair generating section 72, a final edge extraction section 74, a receiving section 76, and an adding section 78.

The automaton generating section 62 inputs strings from the outside. The automaton generating section 62 generates automaton that represent the strings that have been input. Moreover, the automaton generating section 62 can directly input automatons instead of strings. The automaton storage section 64 stores automatons generated by the automaton generating section 62.

The state sending section 66 sends the various states for the automatons stored by the automaton storage section 64 to the server 20 state receiving section 42. Moreover, here, the sending of a state means the sending of an index for identifying the state. The state sending section 66 can send the number of automaton states when the client 30 holds an automaton which is a linear automaton that represents a string.

The initial edge generating section 68 generates initial edges that represent groups of states before, states after, and input characters according to the respective plurality of state transitions in the automaton stored by the automaton storage section 64.

The edge set storage section 70 stores edge sets that contain a plurality of edges that represent state transitions in automatons. Moreover, an edge set preliminarily contains a plurality of initial edges generated by the initial edge generating section 68. In addition, new edges that represent groups of state before, state after, and encrypted character values are added to the edge set by the adding section 78. Moreover, encrypted values are values in which nonfinal characters are encrypted according to the state before and state after and are generated by the server 20.

The edge pair generating section 72 selects a plurality of edges that can be continuously transitioned from the edge set stored in the edge set storage section 70. Furthermore, the edge pair generating section 72 generates an edge pair that represents a string for the encrypted value contained in each of the plurality of edges that has been extracted. An edge pair is, for example, a scalar value calculated by substituting two encrypted values into a function.

The final edge extraction section 74 extracts an edge that represents the transition from the initial state to the final state in the automaton out of the plurality of edges contained in the edge set stored in the edge set storage section 70 as the final edge.

The state receiving section 42 receives the state for the automaton that the client 30 holds from the state sending section 66. The state receiving section 42 can receive the number of automaton states when the client 30 holds a linear automaton that represents a string. The state receiving section 42 generates an index for identifying the various states of the automaton from the number of states when the number of states for the automaton is received.

The context-free grammar storage section 44 stores the context-free grammar. The context-free grammar storage section 44 can incorporate context-free grammar from the outside.

The expansion section 46 expands each of the plurality of production rules in the context-free grammar into a plurality according to transition patterns determined on the basis of the plurality of states for the automaton. Furthermore, the expansion section 46 assigns states before and states after to the nonfinal characters contained in each of the production rules that has been expanded according to the corresponding transition patterns.

Furthermore, the expansion section 46 extracts the start character in the context-free grammar and expands the extracted start character into a plurality according to the plurality of transition patterns determined on the basis of the automaton state. Furthermore, the expansion section 46 assigns states before and states after to the start characters that have been expanded according to the corresponding transition patterns.

The left-hand term processing section 48 generates an encrypted value in which the substitution symbols such as nonfinal characters are encrypted by a predetermined formula in correspondence with the state before and state after assigned for each of the plurality of production rules after expansion by the expansion section 46. Moreover, when the same state before, the same state after, and the same substitution symbols such as nonfinal characters are inputted, the left-hand term processing section 48 executes the encryption processing by a formula that outputs the same encrypted value. The left-hand term processing section 48, for example, generates an encrypted value by substituting the state before, state after, and substitution symbols such as nonfinal characters for variables in a predetermined unidirectional function.

The right-hand term processing section 50 generates an encrypted string value that represents a string for an encrypted value in which each of the plurality of nonfinal characters contained in the substituted symbol string is made to correspond with the assigned state before and state after and encrypted for each of the plurality of production rules after expansion by the expansion section 46. Moreover, the right-hand term processing section 50 encrypts the nonfinal characters by the same formula as the left-hand term processing section 48. Moreover, the encrypted string value is, for example, a scalar value calculated by substituting two encrypted values into a function.

The start character processing section 52 generates an encrypted start character in which the start character is encrypted with each of the plurality of start characters that are nonfinal characters after expansion by the expansion section 46 is made to correspond with the assigned state before and state after. Moreover, the start character processing section 52 encrypts the start character, which is a nonfinal character, by the same formula as the left-hand term processing section 48 and right-hand term processing section 50.

The sending section 54 and the receiving section 76 execute communications via a network. The sending section 54 and the receiving section 76 compare the at least one edge payer generated by the edge pair generating section 72 and each of the plurality of encrypted string values generated by the right-hand term processing section 50. Furthermore, the sending section 54 and the receiving section 76 detect the production rule following expansion for which the encrypted string value matches the edge pair.

In this instance, the sending section 54 and the receiving section 76 hide the plurality of encrypted string values from the client 30 according to a secure set intersection protocol and execute the comparison in a state where the edge pair is hidden from the server 20. A secure set intersection protocol is, for example, described in Non-patent Literature 1.

When a production rule after expansion in which the encrypted string value matches the edge pair is detected, the sending section 54 sends the encrypted value, in other words, the encrypted value generated by the left-hand term processing section 48 in which the substitution symbols for the production rule after expansion in which the encrypted string value matches the edge pair to the client 30 along with the state before and state after assigned to those substitution symbols.

When a production rule after expansion in which the encrypted string value matches the edge pair is detected, the receiving section 76 receives the encrypted value sent from the server 20 along with the state before and state after. The adding section 78 adds the group of the state before, state after, and encrypted value that has been received by the receiving section 76 to the edge set stored in the edge set storage section 70 as a new edge.

In addition, when the adding section 78 has added the new edge to the edge set, the edge pair generating section 72 once again selects a plurality of edges that can be continuously transitioned contained in the new edge set that has been added. Furthermore, the edge pair generating section 72 generates a new edge pair that represents a string for the encrypted value contained in the plurality of edges that has been selected.

When the adding section 78 has added a new edge to the edge set, the sending section 54 and the receiving section 76 once again compare the new edge pair and the encrypted string values corresponding to each of the to the plurality of production rules after expansion and detect the production rules after expansion for which the encrypted string values match the new edge pair. In this instance also, the sending section 54 and the receiving section 76 compare the new edge pair and the plurality of encrypted string values according to a secure set intersection protocol.

When a production rule after expansion in which the encrypted string value matches the edge pair is detected, the sending section 54 once again sends an encrypted value in which the substitution symbol for the production rule after expansion in which the encrypted string value matches the new edge pair is encrypted to the client 30 along with the state before and state after assigned to that substitution symbol.

When a production rule after expansion in which the encrypted string value agrees with the new edge pair is detected, the receiving section 76 receives the encrypted value sent by the server 20 along with the state before and state after. The adding section 78 adds the group of the state before, state after, and encrypted value that has been received from the server 20 to the edge set stored in the edge set storage section 70 as a new edge. Furthermore, the sending section 54 and the receiving section 76 repeat the comparison of the new edge pair and plurality of encrypted string values until the new edge that should have been added to the edge set disappears.

When the new edge that should have been added to the edge set disappears, the sending section 54 and the receiving section 76 compare the encrypted value contained in the final edge extracted by the final edge extraction section 74 and each of the plurality of encrypted start characters generated by the start character processing section 52. In this instance also, the sending section 54 and the receiving section 76 hide the plurality of encrypted start characters from the client 30 according to a secure set intersection protocol and execute the comparison in a state where the encrypted value included in final edge is hidden from the server 20.

Furthermore, when the encrypted value included in the final edge matches the encrypted start character, the receiving section 76 determines that the automaton satisfies the context-free grammar. In addition, when the encrypted value included in the final edge does not match the encrypted start character, the receiving section 76 determines that the automaton does not satisfy the context-free grammar.

According to this constitution above, the authentication system 10 can determine whether or not the automaton satisfies the context-free grammar in a state in which the context-free grammar held by the server 20 is hidden from the client 30 and the automaton held by the client 30 is hidden from the server 20.

Figure 4:
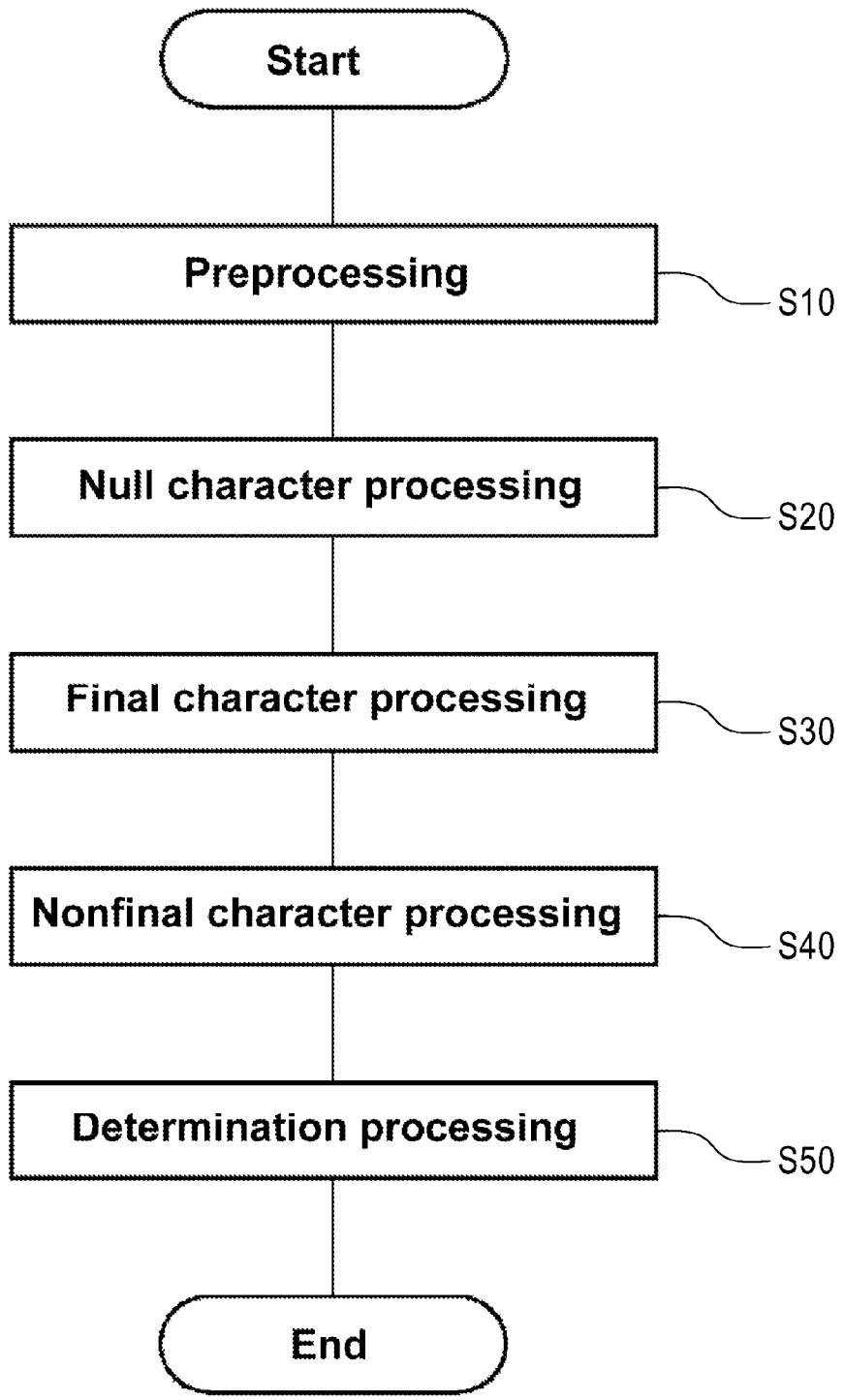
FIG. 4 shows the overall processing flow for the authentication system 10 according to the present embodiment.

FIG. 4 shows the overall processing flow for the authentication system 10 according to the present embodiment. The authentication system 10 executes processing in the following step S10 through step S50 sequentially.

First, in step S10, the authentication system 10 carries out preprocessing. More specifically, the authentication system 10 generates the automaton, acquires the context-free grammar, generates the initial edge, and the like. The details of the preprocessing will be described below with reference to FIG. 5-FIG. 7.

Next, in step S20, the authentication system 10 executes null character processing. More specifically, the authentication system 10 generates an edge corresponding to the production rule in which the substituted symbol string is the null character and adds the generated edge to the edge set. The details of the null character processing will be described below with reference to FIG. 8-FIG. 12.

Next, in step S30, the authentication system 10 executes final character processing. More specifically, the authentication system 10 generates an edge corresponding to the production rule in which the substituted symbol string is the final character and adds the generated edge to the edge set as a transition corresponding to the initial edge. The details of the final character processing will be described below with reference to FIG. 13-FIG. 18.

Next, in step S40, the authentication system 10 executes nonfinal character processing. More specifically, the authentication system 10 generates substitution rules in which values which are encrypted string values representing strings for the plurality of encrypted values in which the nonfinal characters included in the substituted symbol strings are substituted with encrypted values in which the substitution symbols that are nonfinal characters are encrypted.

Furthermore, in step S40, the authentication system 10 determines whether or not the string which is an edge pair for the encrypted value that contains the plurality of edges that have been extracted from the edge set matches the encrypted string value in some substitution rule according to the secure set intersection protocol. When the value which is an edge pair, representing the string for the encrypted value that contains the plurality of edge pairs extracted from the edge set, matches the encrypted string value in some substitution rule, the authentication system 10 adds the encrypted value in which the substitution symbol that are nonfinal character in that substitution rule is encrypted to the edge set as a new edge.

Furthermore, the authentication system 10 repeatedly executes the processing for adding the new edge to the edge set until the new edge is no longer added. Moreover, the details of the nonfinal character processing will be described below with reference to FIG. 19-FIG. 27.

Next, in step S50, the authentication system 10 executes determination processing. More specifically, the authentication system 10 generates an encrypted start character in which a start character that is made to correspond with a predetermined transition pattern on the basis of a plurality of states of the automaton is encrypted. Next, the authentication system 10 determines whether or not the final edge which is an edge representing the transition from the initial state to the final state, extracted from the edge set matches the encrypted start character according to the secure set intersection protocol.

Furthermore, when the encrypted value included in the final edge matches the encrypted start character, the authentication system 10 determines that the automaton satisfies the context-free grammar. Moreover, the details of the determination processing will be described below with reference to FIG. 28-FIG. 30.

Figure 5:
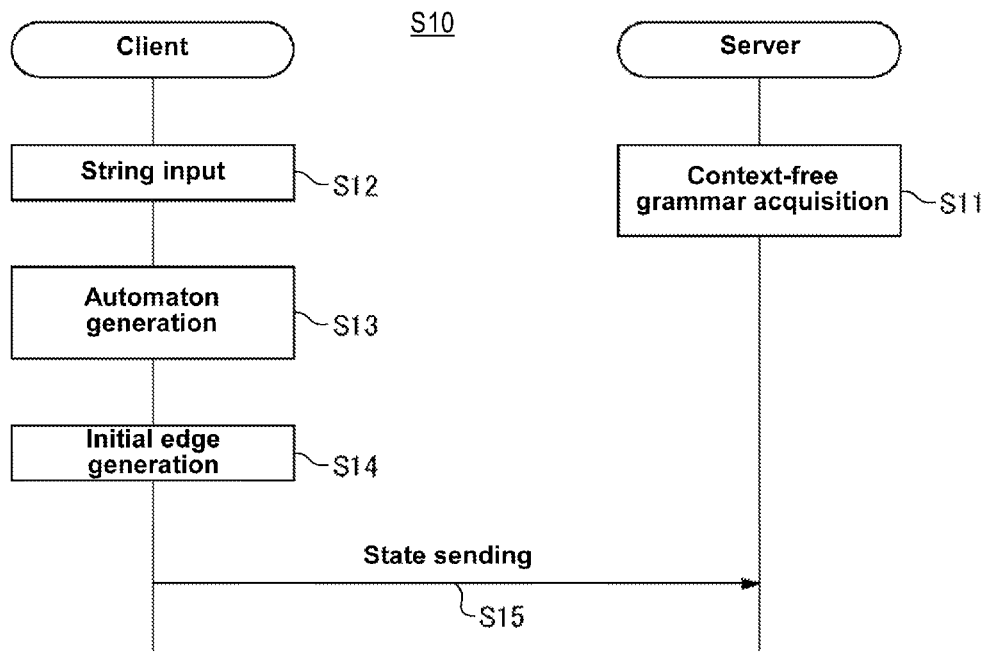
FIG. 5 shows the flow for preprocessing in step S10.
Figure 6:
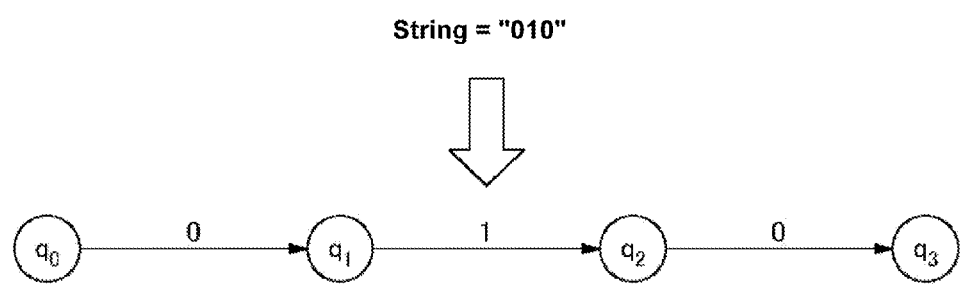
FIG. 6 shows an example of an automaton generated when the string "010" has been input.
Figures 7, 8:
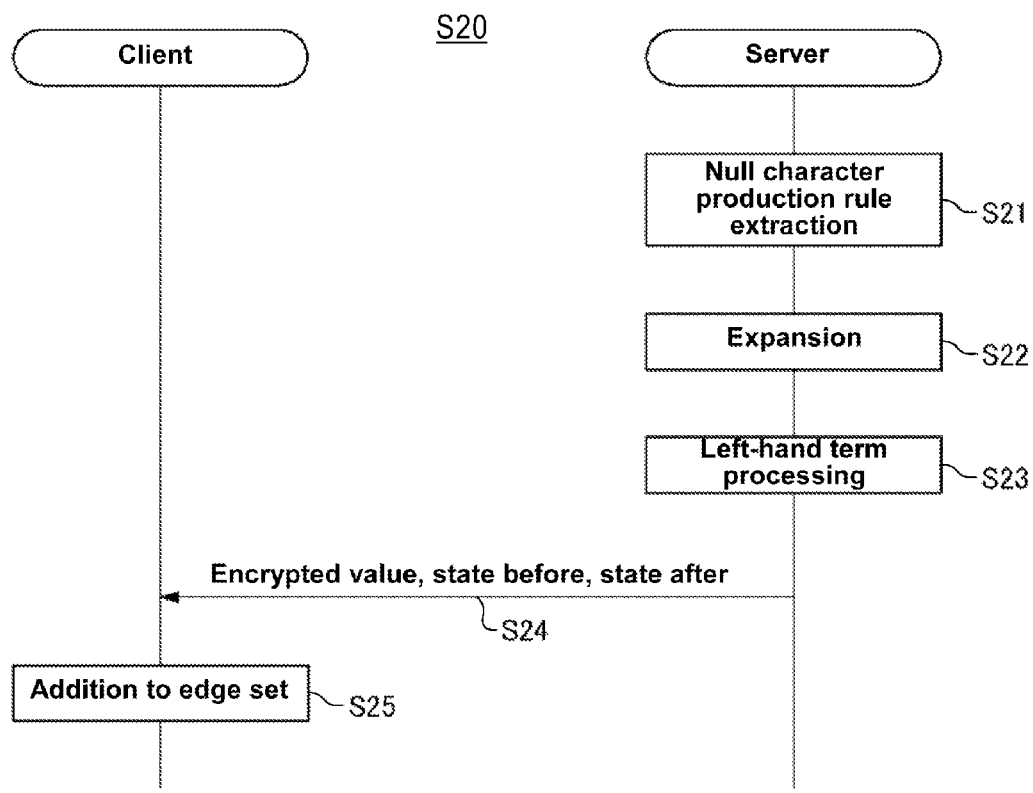
FIG. 7 shows an example of an initial edge.
FIG. 8 shows the flow for empty string processing in step S20.

FIG. 5 shows the flow for preprocessing that is step S10. FIG. 6 shows an example of an automaton generated when the string "010" has been input. FIG. 7 shows an example of an initial edge.

The authentication system 10 executes the processing for the following step S11 through step S15 in the preprocessing that is step S10. First, in step S11, the server 20 acquires the context-free grammar.

Next, in step S12, the client 30 inputs a string. Next, in step S13, the client 30 converts the string that has been input to an automaton. In the present example, the client 30 inputs the string "010" and, as is shown in FIG. 6, an automaton that is represented by a straight line state transition diagram is generated. Moreover, the client 30 can directly input the automaton instead of the string.

Next, in step S14, the client 30 generates an initial edge corresponding to each state of the automaton. The initial edge represents a group of state before, state after, and input characters in the automaton state transition. In the present example, the client 30 generates three initial edges as shown in FIG. 7.

Next, in step S15, the client 30 sends each of the plurality of states for the automaton to the server 20. In this instance, the client 30 sends an index for identifying each state to the server 20. In the present example, the client 30 sends q0, q1, q2, and q3 as indices.

Moreover, when the string is converted to the automaton, a linear automaton is formed; therefore, the client 30 can send the number of states for the automaton instead of the indices for identifying the automaton states. In this instance, the server 20 generates the index for identifying each state of the automaton on the basis of the number of states for the automaton that are received.

Figure 9:
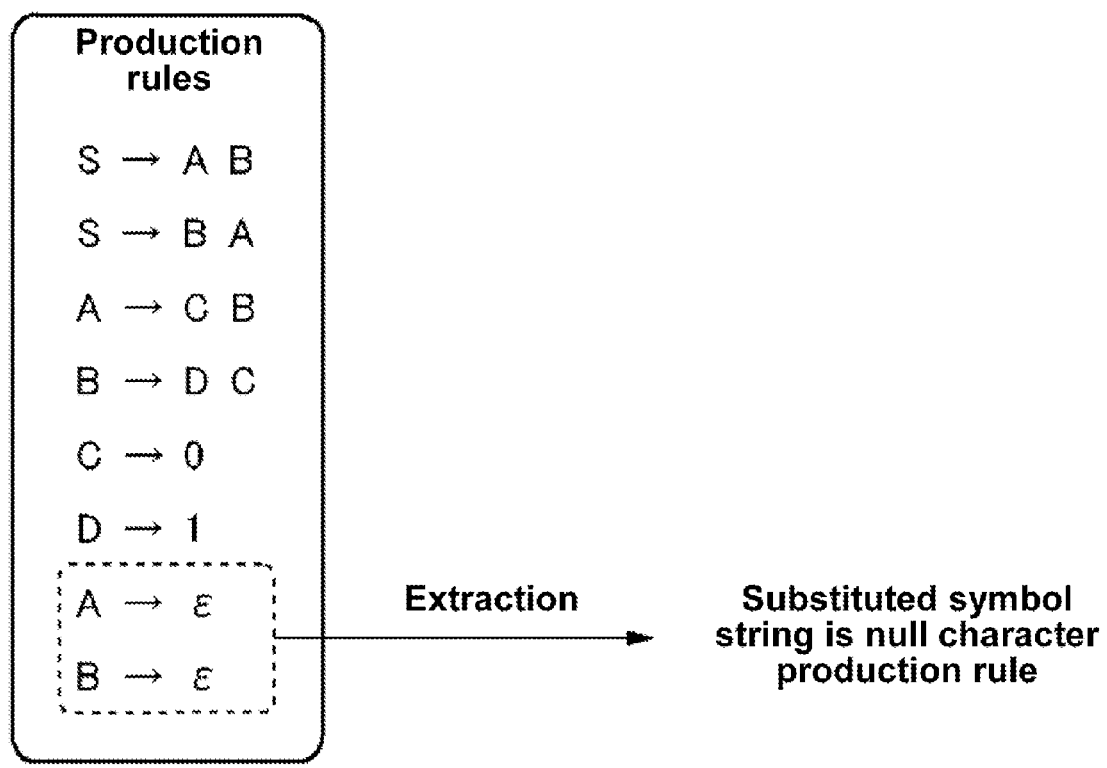
FIG. 9 shows an example of a production rule in which the extracted substituted symbol string is the null character in step S21.
Figure 11:
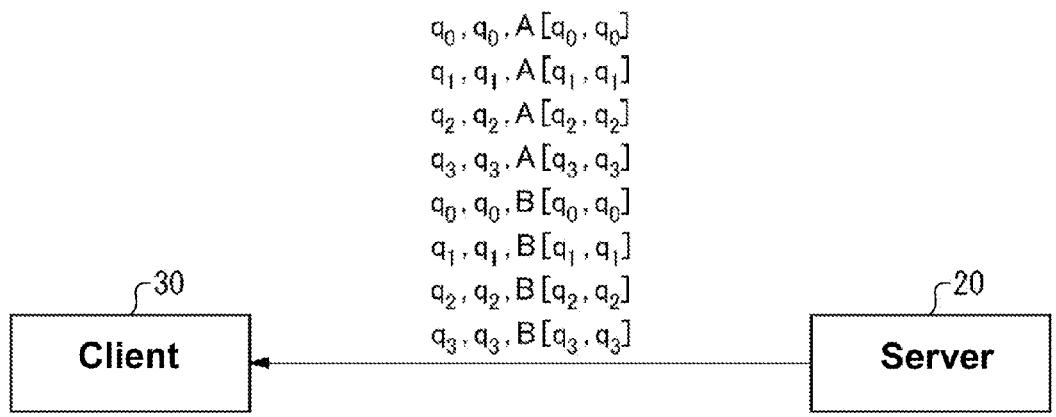
FIG. 11 shows an example of the encrypted value, state before, and state after sent to the client 30 from the server 20 in step S24.
Figure 12:
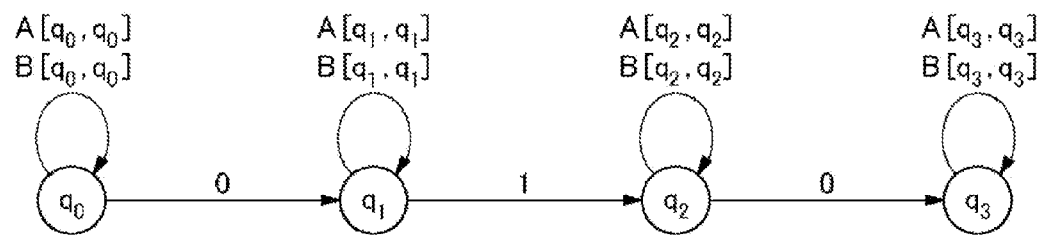
FIG. 12 shows an example of an edge added to an edge set to which edges are added in step S25.

FIG. 8 shows the flow for null string processing in step S20. FIG. 9 shows an example of the processing in step S21. FIG. 10 shows an example of the processing in step S22 and step S23. FIG. 11 shows an example of the processing in step S24. FIG. 12 shows an example of an edge added to an edge set in step S25.

The authentication system 10 executes the processing for the following step S21 through step S25 for null character processing in step S20.

First, in step S21, the server 20 extracts a production rule for which the substituted symbol string is the null character out of the plurality of production rules in the context-free grammar. In the present example, as is shown in FIG. 9, "A→ϵ" and "B→ϵ" are extracted from the set of production rules in the context-free grammar.

Next, in step S22, the server 20 expands the extracted production rule, production rule in which the substituted symbol string is the null character in correspondence with each state of the automaton. Here, the expansion of the production rule corresponds to copying the extracted production rule and generating the plurality. Therefore, in step S22, the server 20 copies the production rule in correspondence with each of the plurality of states for the automaton.

Furthermore, the server 20 a science the same state before and state after two the substitution symbol in other words, nonfinal characters for each of the production rules that have been expanded. In other words, the server 20 assigns a corresponding state as the state before and the same state as the state after do the substitution symbol in other words, nonfinal characters for each generated symbol that has been expanded.

Moreover, the assignment of a state to the substitution symbol or nonfinal characters means relating the index for identifying the state of the automaton to the substitution symbol or nonfinal characters therefor. Therefore, the server 20 can generate a group of the state before, state after, and substitution symbol or nonfinal characters by assigning this state before and state after to the substitution symbol or nonfinal characters.

In the present example, as is shown in FIG. 10, the server 20 expands each of "A→ϵ" and "B→ϵ" in correspondence with the four respective states for the automaton. Furthermore, the server 20 assigns the states before and states after of (q0, q0), (q1, q1), (q2, q2), (q3, q3) to each of the four "A→ϵ" and "B→ϵ". [0067]

Next, in step S23, the server 20 encrypts the substitution symbol or nonfinal characters for the production rule (production rule in which the substituted symbol string is the null character) that has been expanded by a predetermined encryption formula corresponding to the assigned state before and state after. Moreover, the encrypted value in which any state before $q_i$, any state after $q_j$, and any nonfinal string X are encrypted is shown as follows.

$$X[q_i,q_j]=\text{Enc}(q_i,q_j,X) \quad \text{[Equation 1]}$$

This encryption formula is a formula that outputs the same encrypted value when the same state before, the same state after, and the same substitution symbol or nonfinal characters are input. In the present embodiment, the server 20 generates an encrypted value by inputting the index for identifying the state before, the index for identifying the state after, and the nonfinal characters for the variables in a predetermined unidirectional function. In the present example, as is shown in FIG. 10, the server 20 encrypts each of the substitution symbols or nonfinal character for A→ϵ" and substitution symbol or nonfinal character B for B→ϵ" by making a correspondence with the assigned state before and state after.

Next, in step S24, the server 20 sends the encrypted value in which the substitution symbol for the production rule, in which the substituted symbol string is the null character, is encrypted to the client 30 along with the assigned state before and state after. Furthermore, the client 30 receives group of the state before, the state after, and the encrypted value that has been sent by the server 20. In the present example, as is shown in FIG. 11, the server 20 sends the eight groups of state before, state after, and encrypted value to the client 30.

Next, in step S25, the client 30 adds the group of the state before, state after and encrypted value that has been received to the edge set as a new edge. In the present example, as is shown in FIG. 12, the client 30 adds the eight groups of state before, state after, and encrypted value to the edge set, which already contains three initial edges, as new edges.

By executing the processing in step S21 through step S25, the authentication system 10 can generate edges corresponding to production rules in which the substituted symbol string is the null character and add generated edges to the edge set.

Figure 13:
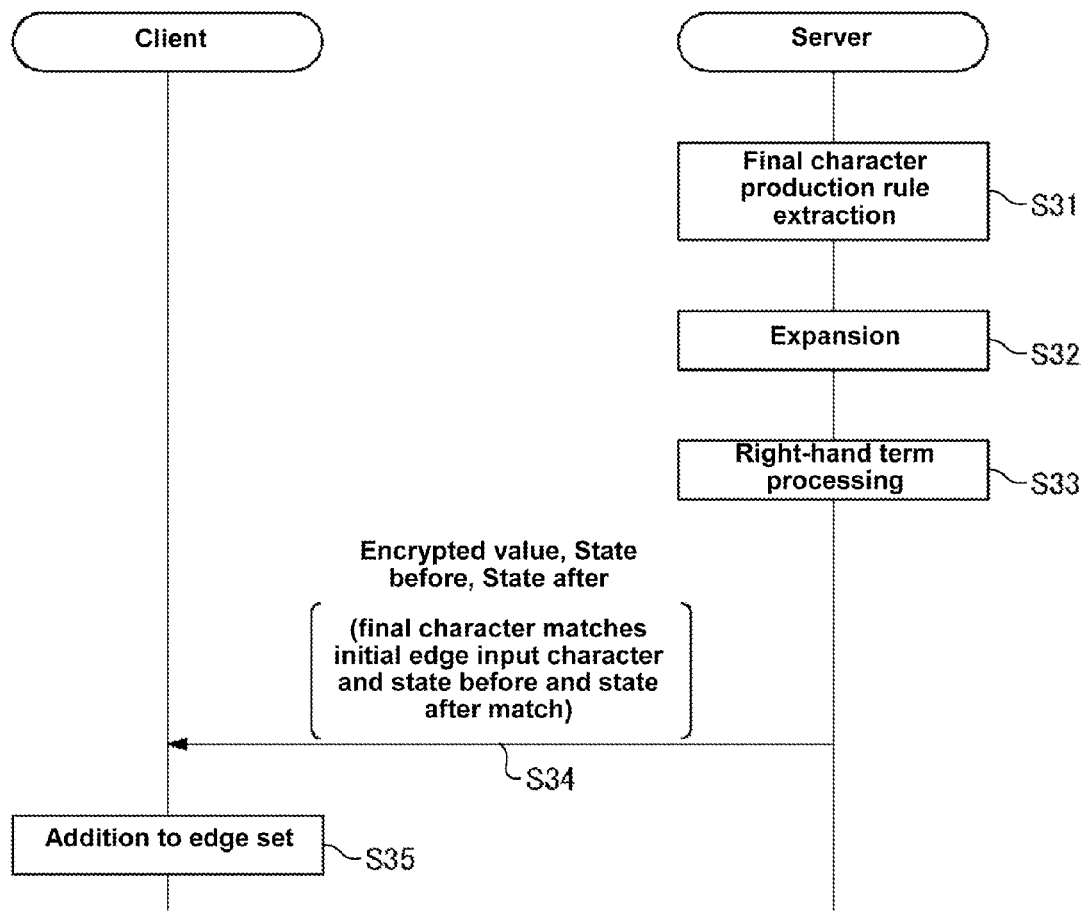
FIG. 13 shows the flow for final character processing in step S30.
Figure 14:
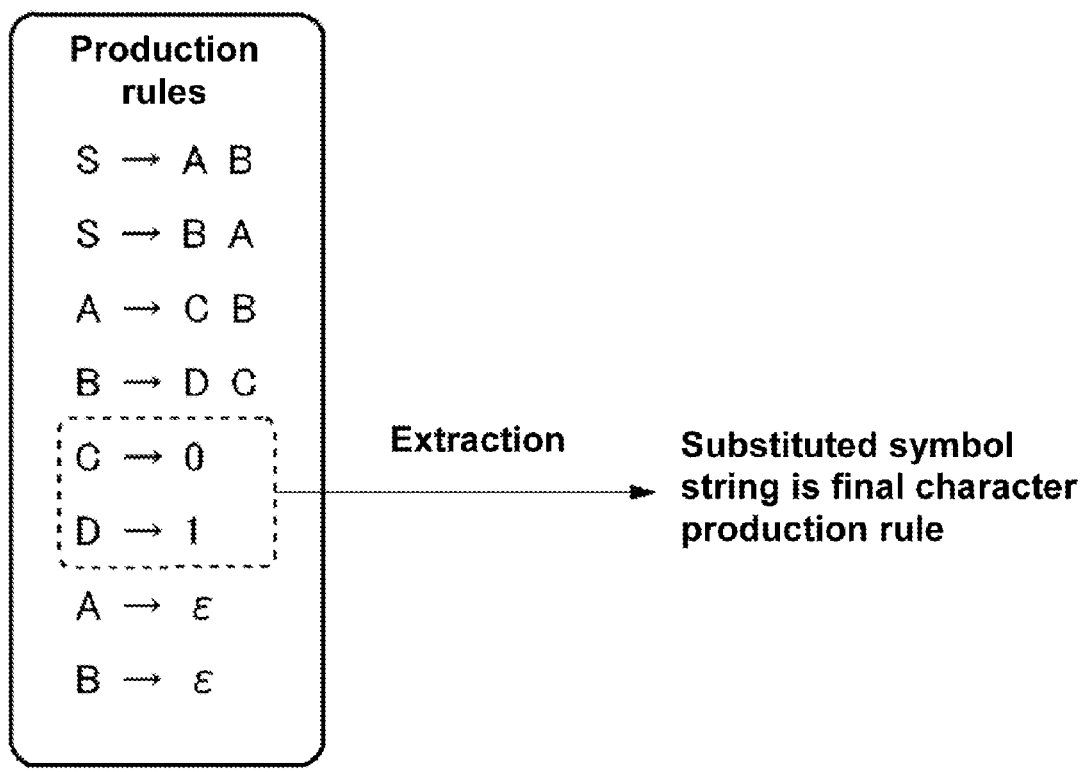
FIG. 14 shows an example of a production rule in which the extracted substituted symbol string is a final character in step S31.
Figure 15:
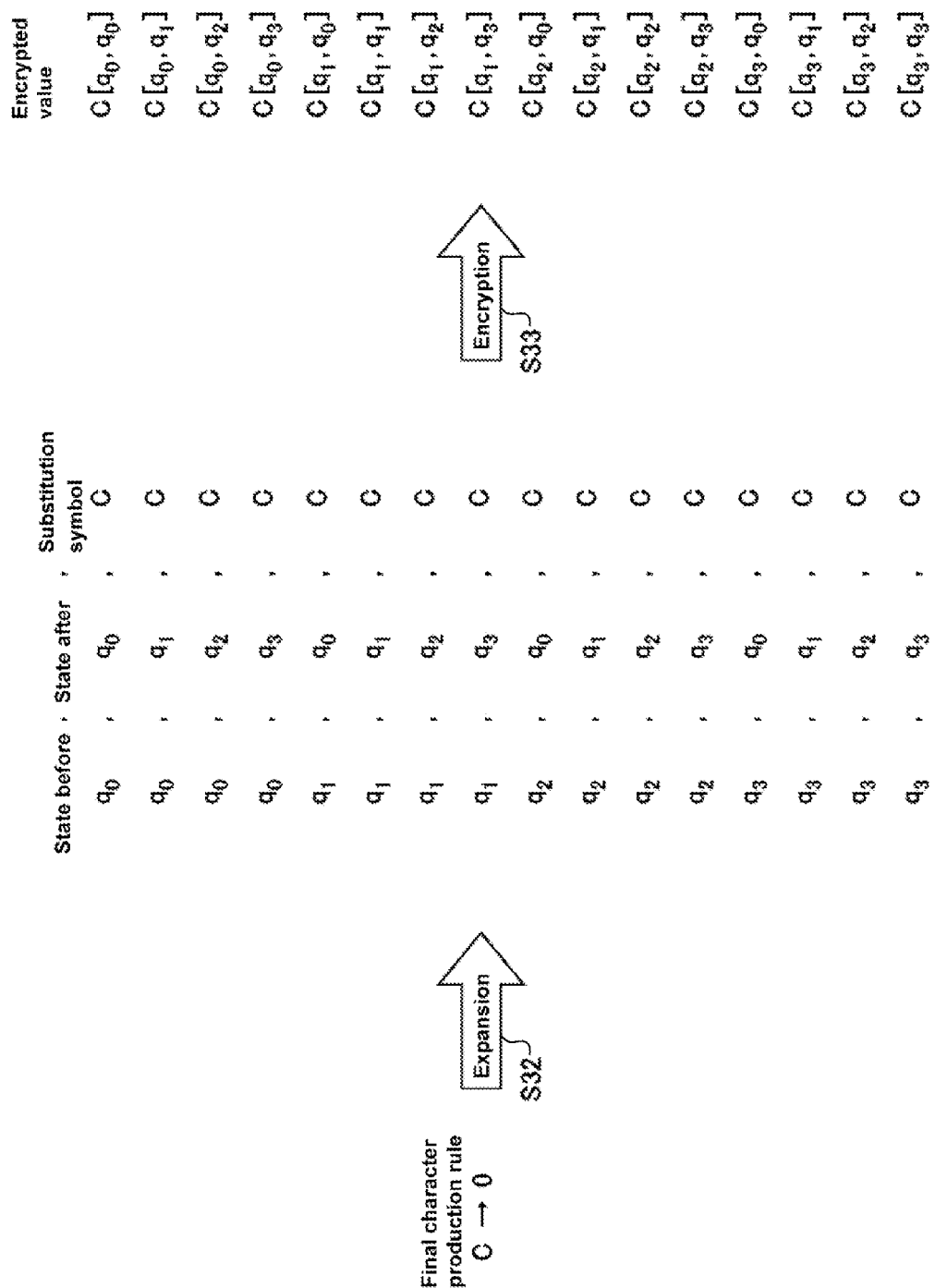
FIG. 15 shows an example of a substitution symbol for a production rule for which the substituted symbol string that is expanded in step S32 is a final character and an example of an encrypted value generated in step S33.
Figure 16:
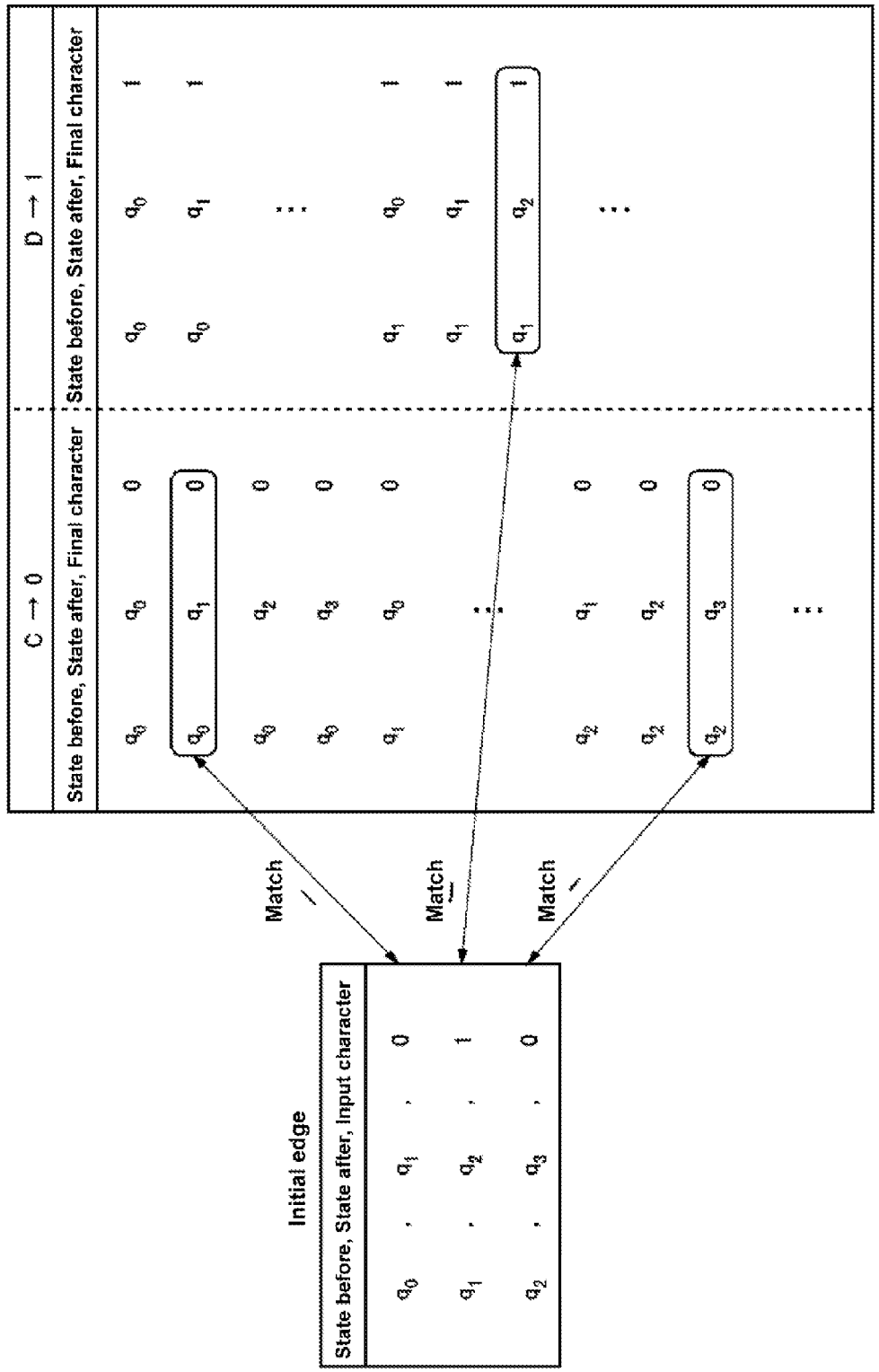
FIG. 16 shows an example of substitution symbols for a production rule after expansion, which matches the state before, state after, and input characters included in any initial edge.
Figure 17:
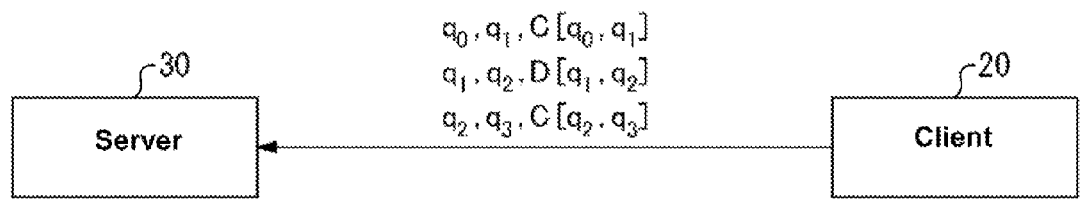
FIG. 17 shows an example of the encrypted value, state before, and state after sent to the client 30 from the server 20 in step S34.
Figure 18:
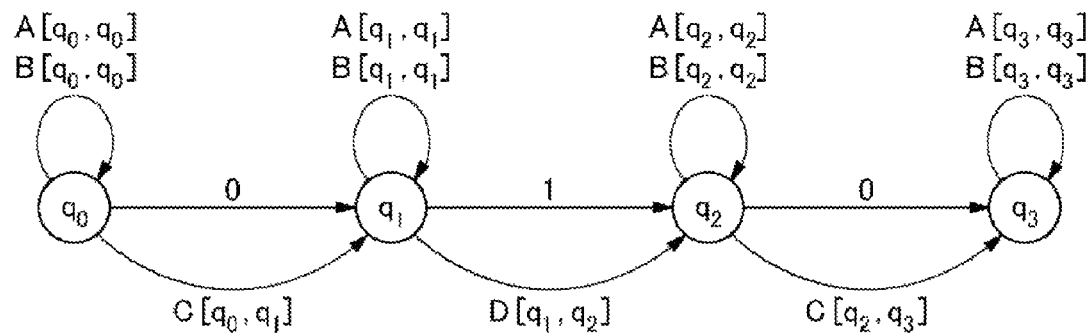
FIG. 18 shows an example of an edge added to an edge set in step S35.

FIG. 13 shows the flow for final character processing in step S30. FIG. 14 shows an example of the processing in step S31. FIG. 15 shows an example of the processing in step S32 and step S33. FIG. 16 shows an example of the comparison processing in step S34. FIG. 17 shows an example of the sending processing in step S34. FIG. 18 shows an example of an edge added to an edge set in step S35.

The authentication system 10 executes the processing for the following step S31 through step S35 for final character processing in step S30.

First, in step S31, the server 20 extracts a production rule for which the substituted symbol string is the final character out of the plurality of production rules in the context-free grammar. In the present example, as is shown in FIG. 14, "C→0" and "D→1" are extracted from the set of production rules in the context-free grammar.

Next, in step S32, the server 20 expands the extracted production rule, production rule in which the substituted symbol string is the final character, making correspondence with a plurality of transition patterns on the basis of the plurality of states for the automaton. For example, when any character is input for an automaton that includes N, N being a natural number of 2 or greater, states, there are N×N transition patterns for state transitions in that automaton. Thus, when the automaton has states, the server 20 expands each of the plurality of production rules extracted so as to correspond to N×N transition patterns, respectively.

Furthermore, the server 20 assigns a state before and a state after to the substitution symbols, in other words, nonfinal characters for each of the production rules that has been expanded in accordance with the corresponding transition pattern. In other words, the server 20 assigns the state of the transition origin for the corresponding transition pattern as the state before and assigns the transition destination for the corresponding transition pattern as the state after for the substitution symbol, in other words, nonfinal characters for each generated symbol that has been expanded.

In the present example, as is shown in FIG. 15, the server 20 expands the substitution symbol, nonfinal character C for the production rule of "C→0" into 16 production rules, and assigns a state before and a state after according to the transition patterns for each of the 16 production rules after expansion. Moreover, the server 20 the expansion process for the other production rules, for example, "D→1", and the process for assigning the state before and the state after are omitted from the drawing.

Next, in step S33, the server 20 Inc. rips the substitution symbols (nonfinal characters) for the production rules, production rules in which the substituted symbol string is nonfinal characters, that have been expanded by a predetermined encryption formula in which a correspondence is made with the assigned states before and states after. Moreover, here, the server 20 generates an encrypted value by encrypting the substitution symbols, nonfinal characters, by the same encryption formula as the encryption formula executed by step S23.

In the present example, as shown in FIG. 15, the server 20 encrypts the substitution symbol or nonfinal character C of "C→0" by making a correspondence with the assigned state before and state after. Moreover the execution of the encryption process for the other production rules, for example, "D→1", by the server 20 is omitted from the drawing.

Next, in step S34, the server 20 and the client 30 communicate the production rules, production rules where the substituted symbol strings are final characters, after expansion, which are stored by the server 20, and the initial edge is included in the edge set stored by the client 30, with each other by the secure set intersection protocol.

More specifically, the server 20 and the client 30 determine whether or not the input characters included in the initial edges and the final characters of the production rules after expansion match. Along with this, the server 20 and the client 30 determine whether or not the states before and states after included in the initial edges and the states before and states after assigned in the substitution symbols for the production rules after expansion match. In the present example, as shown in FIG. 16, the server 20 and the client 30 determine whether or not the groups of state before, state after, and input state included in the initial edges completely match the groups of state before, state after, and nonfinal characters in the production rules after expansion.

Furthermore, the server 20 sends the encrypted values, in other words, the encrypted values generated in step S33, in which the substitution symbols for the production rules in which the final characters match the input characters included in the initial edges and the states before and states after assigned in the substitution symbols match the states before and states after included in those initial edges match have been encrypted to the client 30 along with the assigned states before and states after. Furthermore, the client 30 receives groups of the state before, the state after, and the encrypted value that have been sent by the server 20. In the present example, as shown in FIG. 17, the server 20 sends the groups of state therefore, the state after, and encrypted value that respectively match three initial edges to the client 30.

Moreover, in this instance, the server 20 and the client 30 hide the initial edges from the server 20 and receive and hand over the encrypted values and the like. In the present embodiment, the server 20 and the client 30 carry out communications by using the secure set intersection protocol for creating confidentiality.

Next, in step S35, the client 30 adds the group of the state before, state after and encrypted value that has been received to the edge set as a new edge. In the present example, as shown in FIG. 18, the client 30 adds three new edges to the edge set that contains the three initial edges and edges corresponding to the null character.

By executing the processing in step S31 through step S35, the authentication system 10 can generate edges corresponding to production rules in which the substituted symbol string is the final character and add generated edges to the edge set as transitions corresponding to the initial edges.

Figure 19:
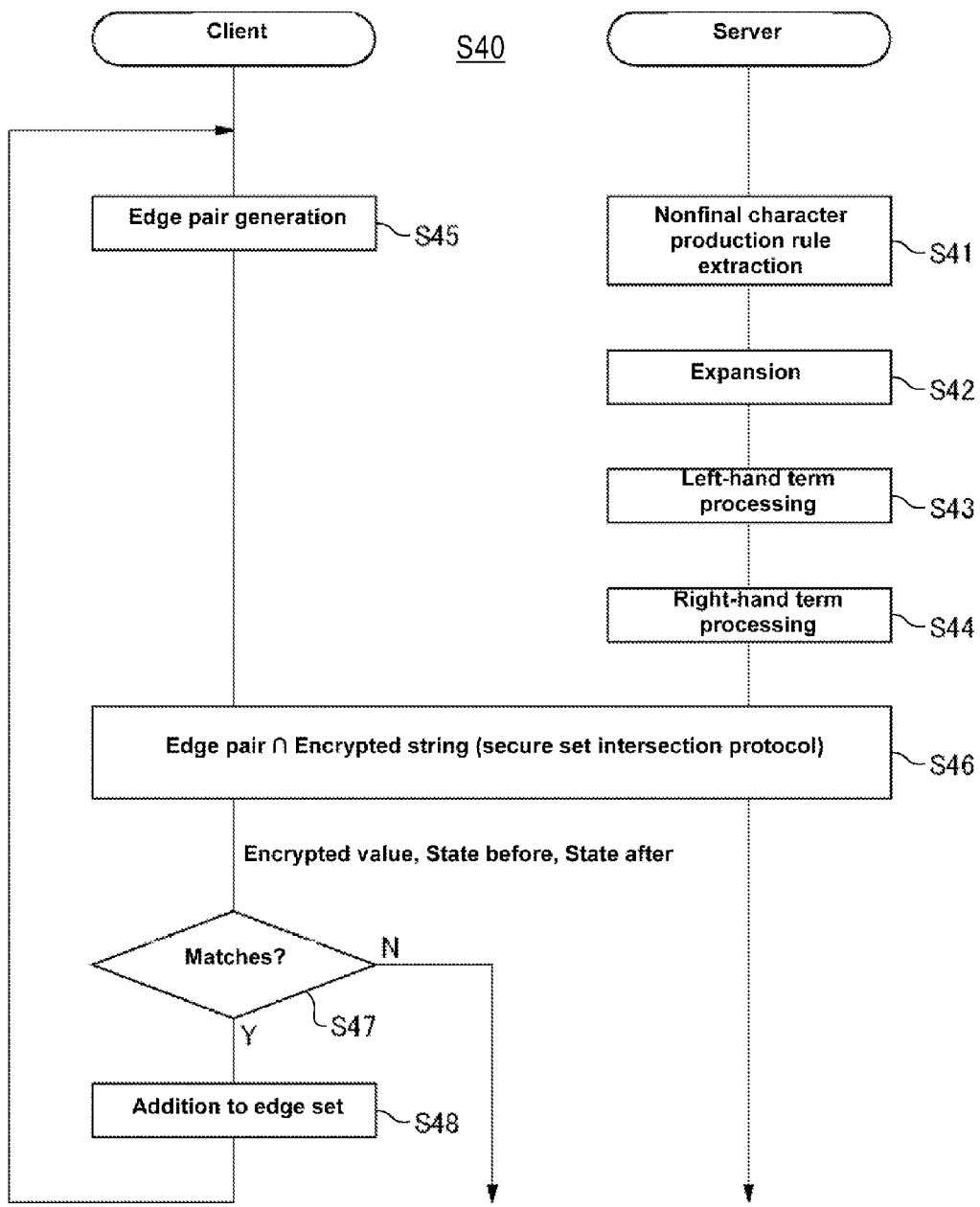
FIG. 19 shows the flow for nonfinal character processing in step S40.
Figure 20:
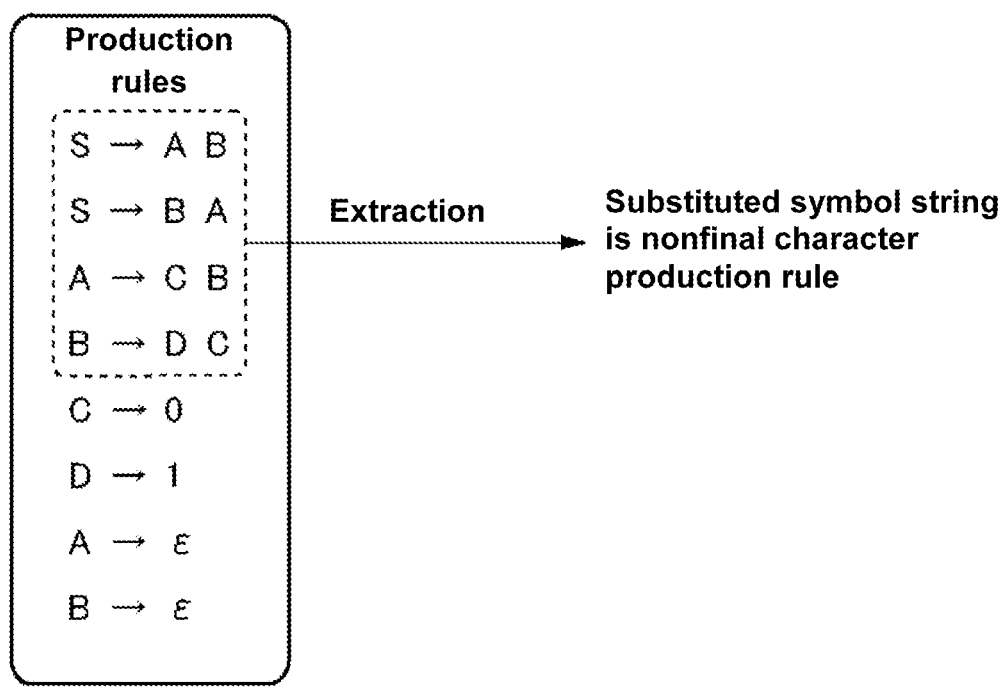
FIG. 20 shows an example of a production rule in which the extracted substituted symbol string that is extracted in step S41 is a string of nonfinal characters.
Figure 23:
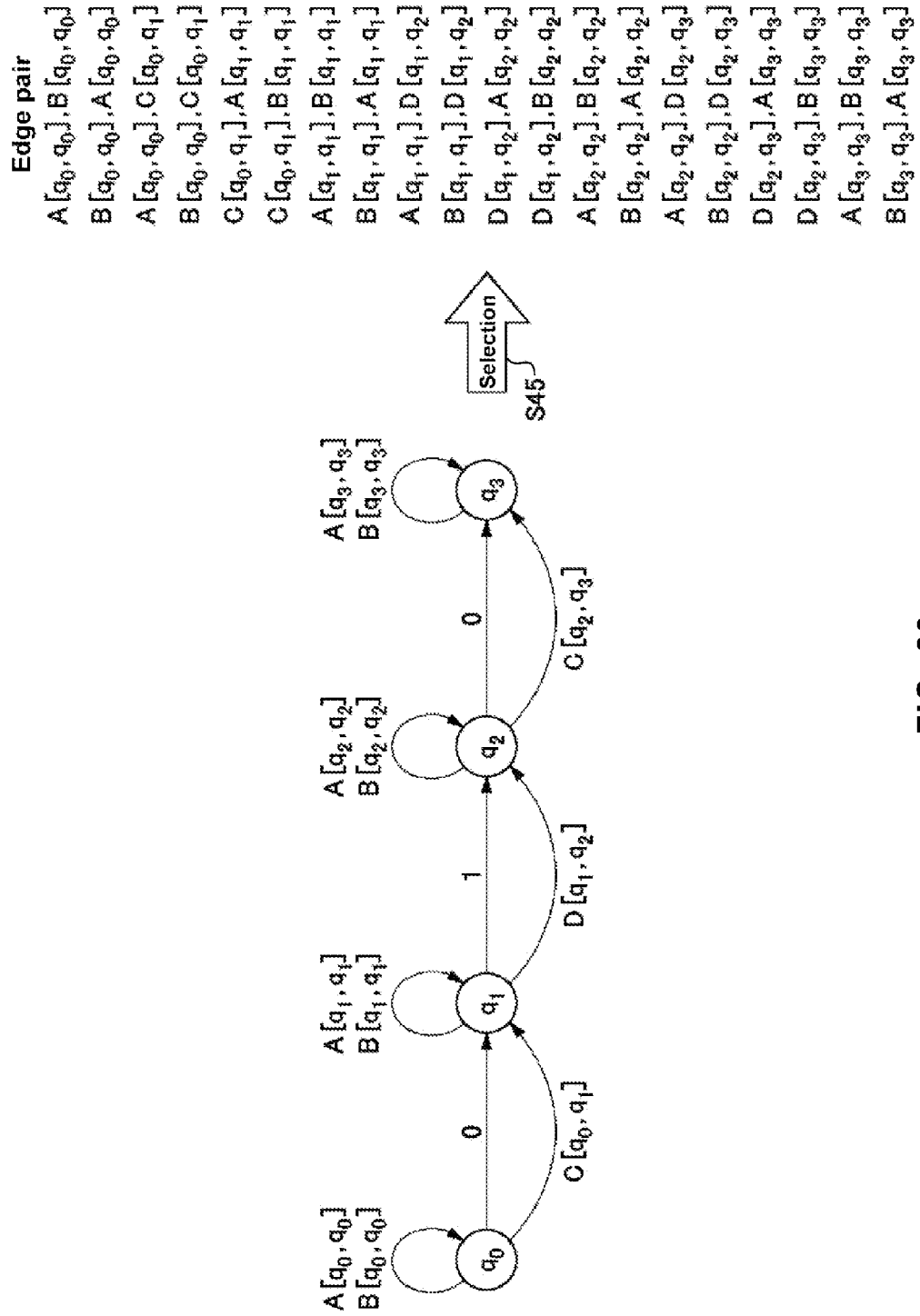
FIG. 23 is an example of an edge pair selected in step S45.
Figure 25:
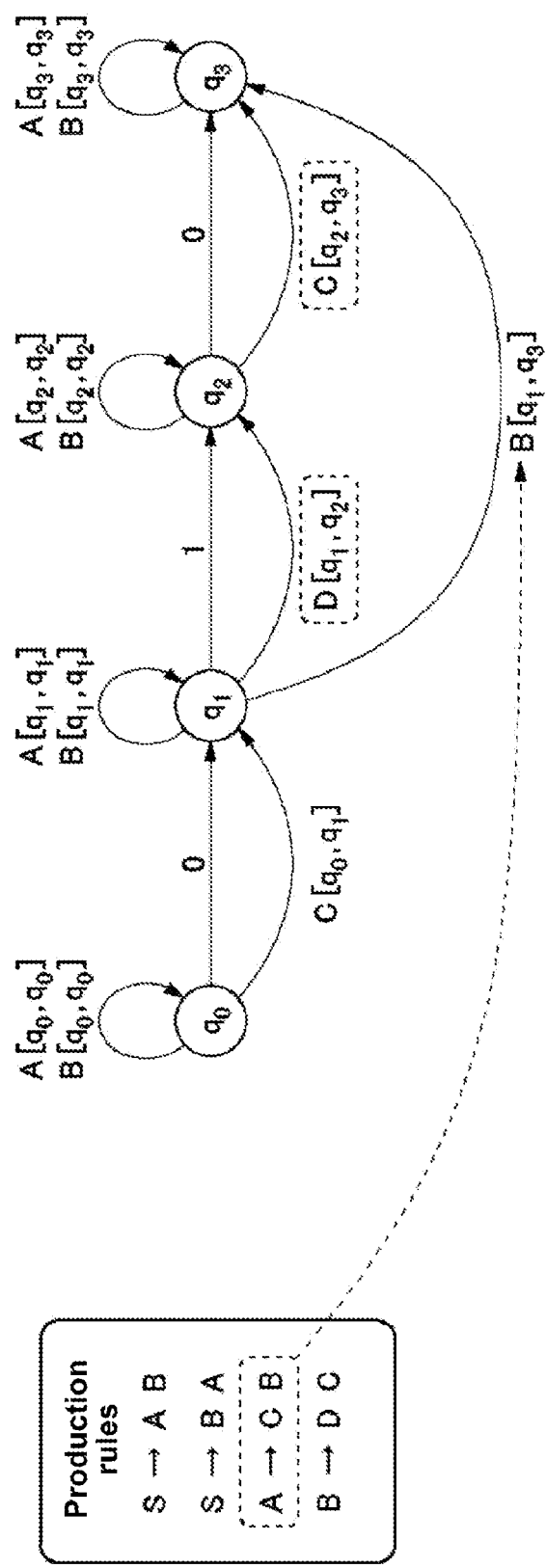
FIG. 25 shows an example of an edge added to an edge set in step S35 in the first loop.
Figure 26:
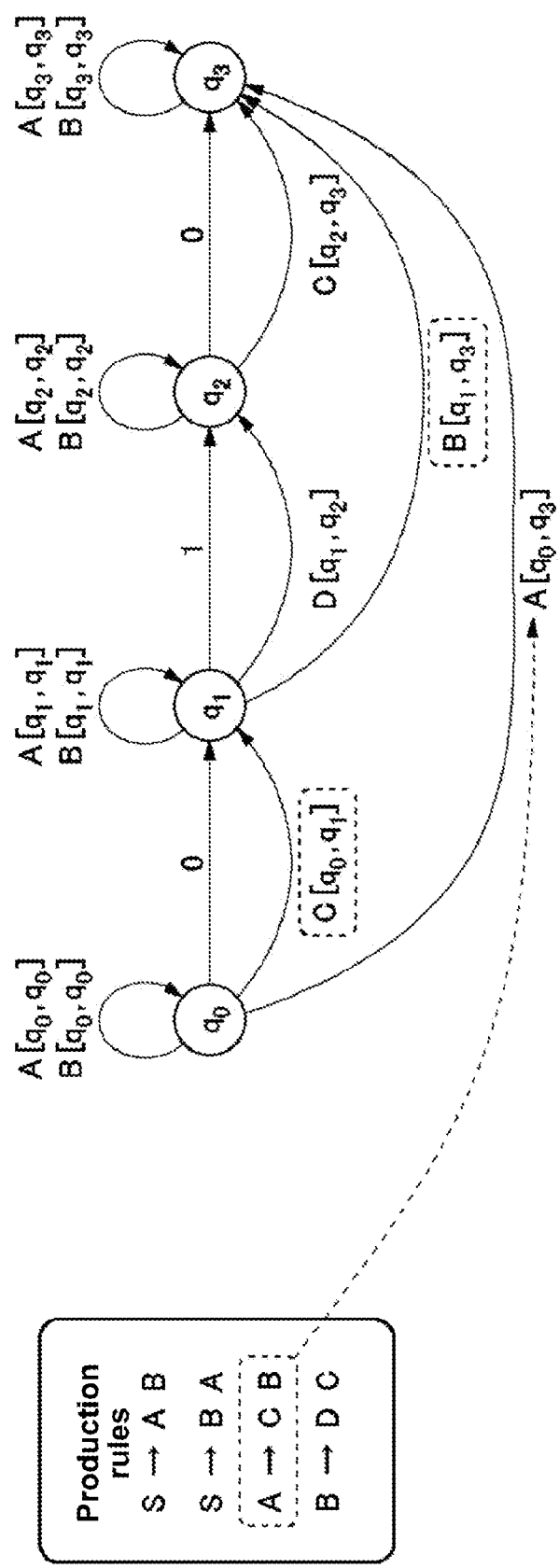
FIG. 26 shows an example of an edge added to an edge set in step S35 in the second loop.
Figure 27:
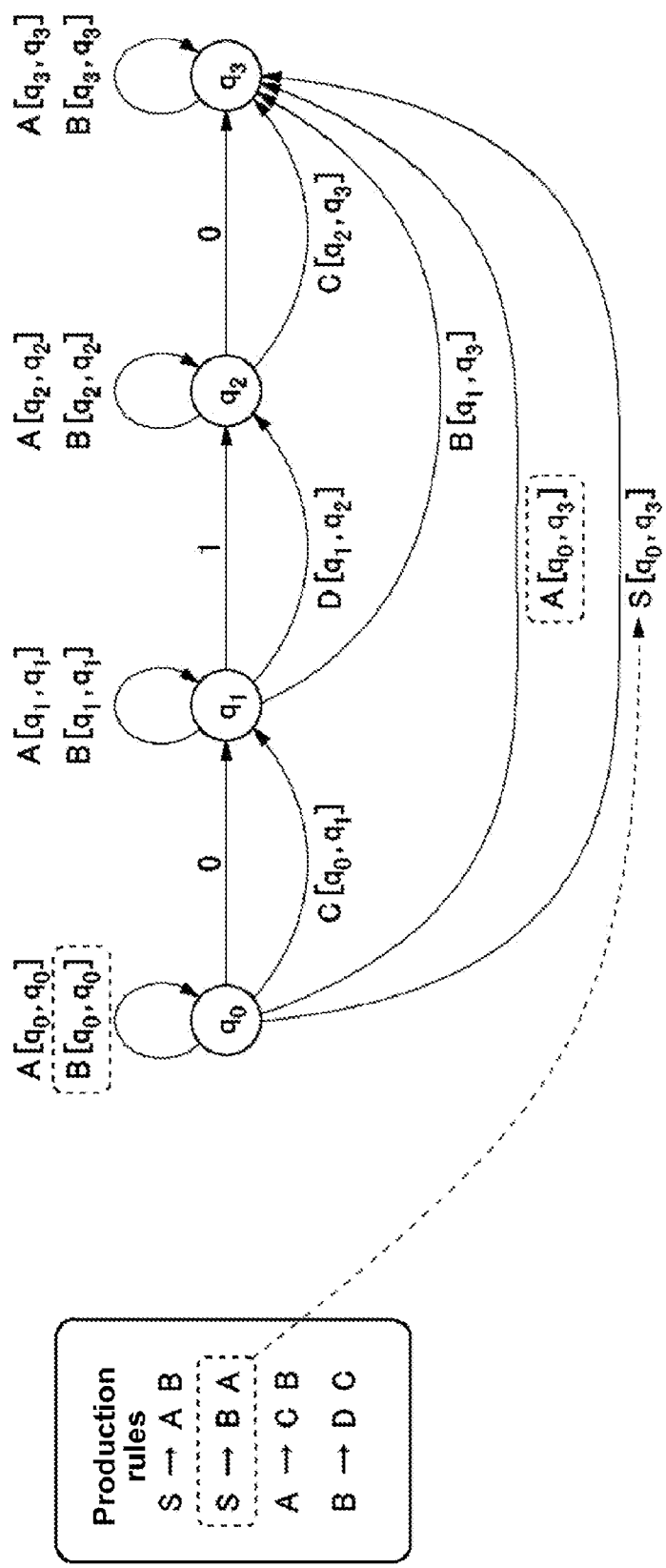
FIG. 27 shows an example of an edge added to an edge set in step S35 in the third loop.

FIG. 19 shows the flow for nonfinal character processing in step S40. FIG. 20 shows an example of the processing in step S41. FIG. 21 shows an example of the processing in step S42. FIG. 22 shows an example of the processing in step S44. FIG. 23 shows an example of the processing in step S45. FIG. 24 shows an example of the processing for creating a scalar value in step S45. FIG. 25, FIG. 26, and FIG. 27 showing example of edges that are added to the edge set.

The authentication system 10 executes the processing for the following step S41 through step S48 for nonfinal character processing in step S40.

First, in step S41, the server 20 extracts a production rule for which the substituted symbol string is a string of two nonfinal characters out of the plurality of production rules in the context-free grammar. In the present example, as is shown in FIG. 20, "S→AB", "S→BA", "A→CB", and "B→DC" are extracted from the set of production rules in the context-free grammar.

Next, in step S42, the server 20 expands the extracted production rule making correspondence with a plurality of transition patterns on the basis of the plurality of states for the automaton. Furthermore, the server 20 assigns states before and states after to the each of the nonfinal characters contained in each of the production rules that have been expanded according to the corresponding transition patterns.

Here, the server 20 makes a correspondence with a transition pattern such that the substitution symbols, left-hand side, for the production rules and the substituted symbol strings, right-hand side, can replace each other without inconsistency. For example, the server 20 assigns the state before and the state after shown in the following equation to each of the nonfinal characters for the production rule of "X→YZ". Moreover, X, Y, and Z represent any nonfinal characters.

$$X \longrightarrow X\ Z \qquad [\text{Equation 2}]$$
$$\downarrow \text{assignment}$$
$$X(q_i, q_j) \longrightarrow Y(q_i, q_k)Z(q_k, q_j)$$

In other words, the server 20 makes a correspondence with a transition pattern such that the state before for the substitution symbol, nonfinal character X, and the state before for the nonfinal character Y, which is the first substituted symbol string, are made the same. Furthermore, the server 20 makes a correspondence with a transition pattern such that the state after for the substitution symbol, nonfinal character X, and the state after for the second nonfinal character Z for the substituted symbol string are made the same. In addition, furthermore, the server 20 makes a correspondence with a transition pattern such that the state after for the first nonfinal character Y for the substituted symbol string and the state after for the second nonfinal character Z for the substituted symbol string are made the same.

The server 20 expands each production rule by making correspondence with all of these transition patterns on the basis of the plurality of states for the automaton. Furthermore, the server 20 assigns states before and states after to each of the first nonfinal characters for the substituted symbol strings and the second final characters for the substituted symbol strings according to a corresponding transition pattern.

In the present example, as is shown in FIG. 21, the server 20 expands the 24 production rules for the substitution symbols for the production rule of "B→DC" and assigns a state before and a state after to each of the three nonfinal characters.

Moreover, the server 20 the expansion process for the other production rules and the process for assigning the state before and the state after are omitted from the drawing.

Next, in step S43, the server 20 encrypts the substitution symbols which are nonfinal characters for the production rules, production rules in which the substituted symbol strings are a string of two nonfinal characters, that have been expanded by a predetermined encryption formula in which correspondence is made with the assigned state before and state after. Moreover, here, the server 20 generates an encrypted value in which encryption is carried out by the same encryption formula as the encryption formula executed in step S23 and step S33.

Next, in step S44, the server 20 encrypts each of the two nonfinal characters for the substituted symbol string of the production rule, production rule in which the substituted symbol string is two nonfinal characters, that has been expanded by making a correspondence with the assigned state before and state after. Moreover, here, the server 20 generates an encrypted value in which encryption is carried out by the same encryption formula as executed in step S43 for each of the nonfinal characters.

Furthermore, the server 20 generates an encrypted string value that represents a string for the encrypted value in which each of the plurality of nonfinal characters included in the substituted symbol string for each of the plurality of production rules that has been expanded is encrypted by making a correspondence with the assigned state before and state after. The encrypted string value is, for example, a scalar value calculated by substituting the encrypted values for each of the two nonfinal characters into a function.

For example, the server 20 generates an encrypted string value that has been made a scalar value by a function Dg( ) as shown in equation (11) on the basis of five variables: $q_i$, $q_k$, $Y[q_i, q_k]$, and $Z[q_k, q_j d]$.

[Equation 3]

$$\text{Encrypted string value} = D\_g(q_i, q_k, q_j, Y[q_i, q_k], Z[q_k, q_j]) \quad (11)$$

Moreover, here, qi represents the index for the state before assigned to the first nonfinal character for the substituted symbol string. qk represents the index, in other words, the index for the state before assigned to the second nonfinal character for the state after assigned to the first nonfinal character for the substituted symbol string. qj represents the index for the state after assigned to the second nonfinal character for the substituted symbol string.

$Y[q_i$ and $q_k]$ represent encrypted values in which the state before and state after assigned to the first nonfinal character for the substituted symbol string have been encrypted. $Z[q_i$ and $q_k]$ represent encrypted values in which the state before and state after assigned to the second nonfinal character for the substituted symbol string have been encrypted.

In the present example, as is shown in FIG. 22, the server 20 generates an encrypted string value using the function D_g( ) making correspondences for each of the 24 production rules after expansion for the substitution symbols for the production rule of "B→DC". Moreover, the server 20 the expansion process for the other production rules and the process for assigning the state before and the state after are omitted from the drawing.

Next, in step S45, the client 30 selects two edges that can undergo a continuous transition from the plurality of edges included in the edge set. In other words, the client 30 selects two edges such that the state after for the leading edge and the state before for the following edge match. Moreover, in this instance, the client 30 selects edge is other than the initial edge included in the edge set.

Furthermore, the client 30 generates an edge pair representing the string for the encrypted value that is included in each of the two edges that have been selected. In the present example, as is shown in FIG. 23, the client 30 generates 20 edge pairs from the edge set for the stages for which the final character processing in step S30 has completed.

The edge pair is, for example, a scalar value calculated by substituting the encrypted values included in each of the two edges selected in a function. For example, the client 30 generates the edge pair by a function D_a( ) as shown in equation (12) below on the basis of five variables: qi, qk, qj, Y[qi, qk], and Z[qk, qj].

[Equation 4]

$$\text{Edge pair} = D\_a(q_i, q_k, q_j, Y[q_i, q_k], Z[q_k, q_j]) \quad (12)$$

Moreover, here, the function D_a( ) shown in equation (12) is the same as the function D_a( ) shown in equation (11). In addition, in equation (12), qi represents an index for the state before included in the leading edge of the two edges selected. qk represents an index, in other words an index for the state before for the following edge of the two edges selected for the state after included in the leading edge of the two edges selected. qj represents an index for the state after for the following edge of the two edges selected.

In addition, $Y[q_i, q_k]$ represents the encrypted value included in the leading edge of the two edges selected. $Z[q_k, q_j]$ represents the encrypted value included in the following edge of the two edges selected. In the present example, as is shown in FIG. 24, the client 30 generates an edge pair that has been made to scalar value from the three states and two encrypted values.

Next, in step S46, the server 20 and the client 30 compare each of the plurality of encrypted string values stored by the server 20 and each of the plurality of edge pairs stored by the client 30 by communications carried out using the secure set intersection protocol. In other words, the server 20 and the client 30 compare each of the plurality of encrypted string values with each of the plurality of the edge pairs in a state where the plurality of encrypted string values is hidden from the client 30 and the plurality of edge pairs is hidden from the server 20.

Furthermore, when a production rule in which an encrypted string that matches some edge pair is present, the server 20 sends an encrypted value in other words, the encrypted value generated in step S43, in which the substitution symbol for the production rule in which the encrypted string value matches some edge pair to the client 30 along with the assigned state before and state after. In addition, the client 30 receives the group of the state before, state after, and encrypted value sent by the server 20.

Next, in step S47, the client 30 determines whether or not some encrypted string value matches some edge pair. When some encrypted string value does not some edge pair, No in step S47, the client 30 ends the nonfinal character processing in step S40.

When some encrypted string value matches some edge pair, Yes in step S47, the client 30 moves the processing to step S48. Next, in step S48, the client 30 adds the group of the state before, state after and encrypted value that has been received to the edge set as a new edge.

Next, the client 30 returns processing to step S45 When the processing returns, the client 30 once again selects a plurality of edges that can undergo a continuous transition included in the new edges that have been added in step S45. Furthermore, the client 30 generates a new edge pair that represents a string for the encrypted value contained in the plurality of edges that has been selected.

Next, in step S46, the server 20 and client 30 once again compare the new edge pairs and each of the plurality of encrypted string values by communications carried out using the secure set intersection protocol. When a production rule in which the encrypted string value matches a new edge pair is present, the server 20 sends the encrypted value in which the substitution symbol for the production rule for which the encrypted string value matches some edge pair to the client 30 along with the assigned state before and state after. Furthermore, the server 20 and the client 30 repeat the loop processing for step S45 through step S48 until the new edge to be added to the edge set disappears.

In the present example, as is shown in FIG. 25, the client 30, in the first loop processing, receives an encrypted value of $B[q_1, q_3]$ corresponding to the edge pair ($D[q_1, q_2]$ $C[q_2, q_3]$) from the server 20 and adds the same as a new edge. Next, as is shown in FIG. 26, the client 30, in the second loop processing, receives an encrypted value of $A[q_0, q_3]$ corresponding to the edge pair ($C[q_0,q_1]$ $B[q_1,q_3]$) from the server 20 and adds the same as a new edge. Finally, as is shown in FIG. 27, the client 30, in the third loop processing, receives an encrypted value $S[q0, q_3]$ corresponding to the edge pair ($B[q_0, q_0]$ $A[q_0, q_3]$) from the server 20 and adds the same as a new edge.

Furthermore, in the present example, when the server 20 and the client 30 have finished the third loop processing, the edge to be added disappears. Therefore, the server 20 and the client 30 and this nonfinal character processing in step S40 after the third loop processing has completed.

By executing the processing above in step S41 through step S48, the authentication system 10 generates substitution rules for substituting encrypted string values with encrypted values for each of the plurality of production rules in which the substituted symbol string is a string for the plurality of nonfinal characters. Furthermore, when the edge pair matches an encrypted string value in some substitution rule, the authentication system 10 can add the encrypted value in which the substitution symbol for this substitution rule is encrypted to the edge set as a new edge by the secure set intersection protocol.

Figure 28:
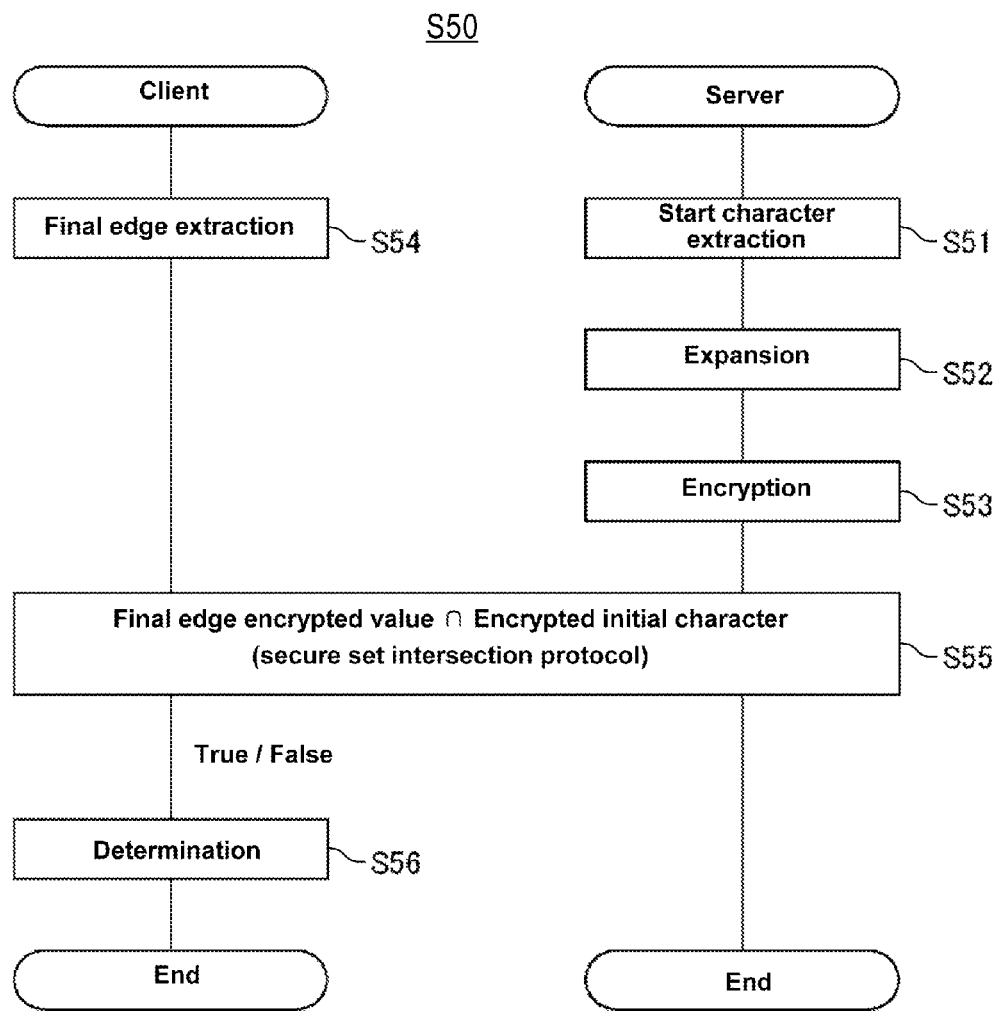
FIG. 28 shows the flow for determination processing in step S50.
Figure 29:
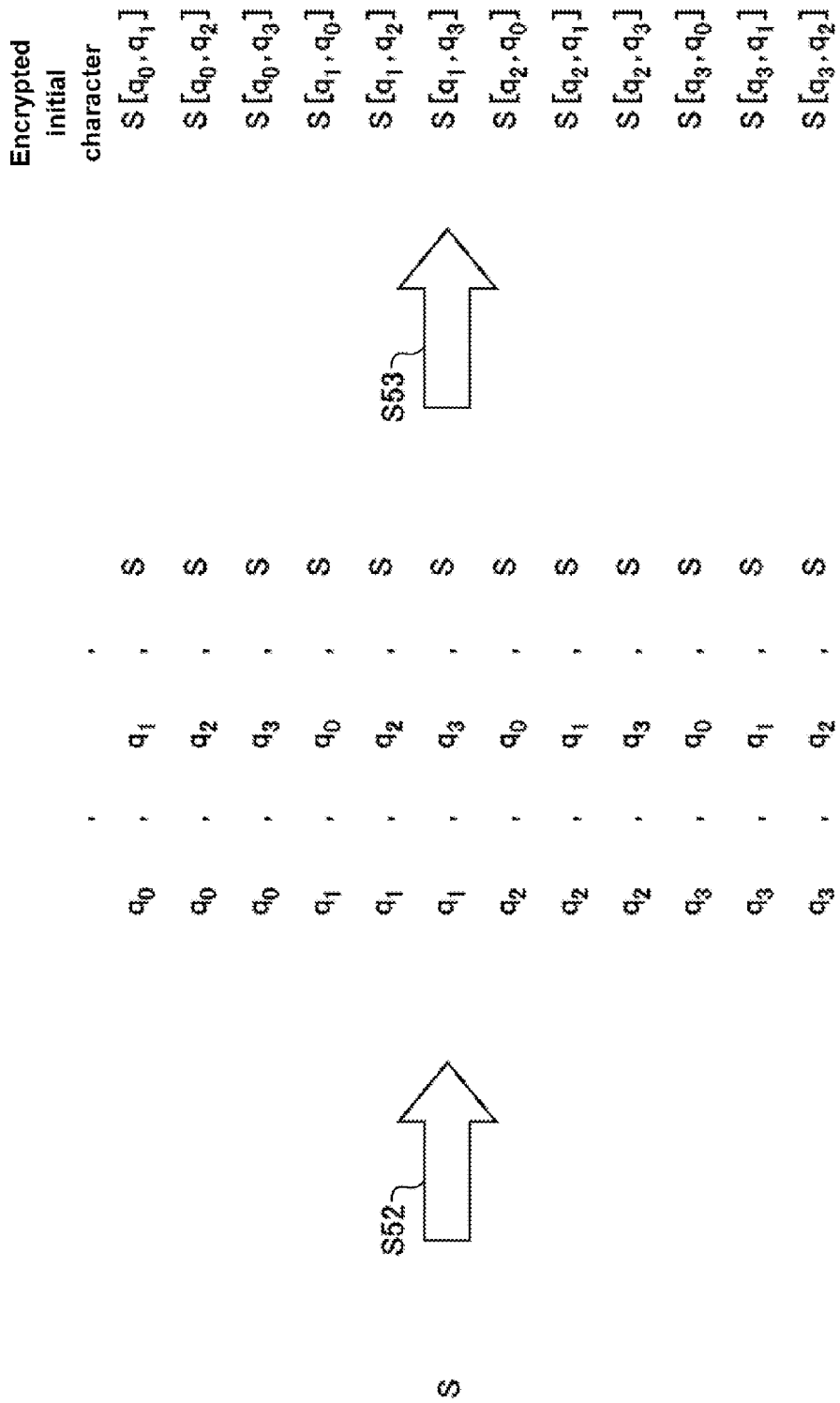
FIG. 29 shows an example of an example of starting characters expanded in step S52 and encrypted starting characters generated in step S53.
Figure 30:
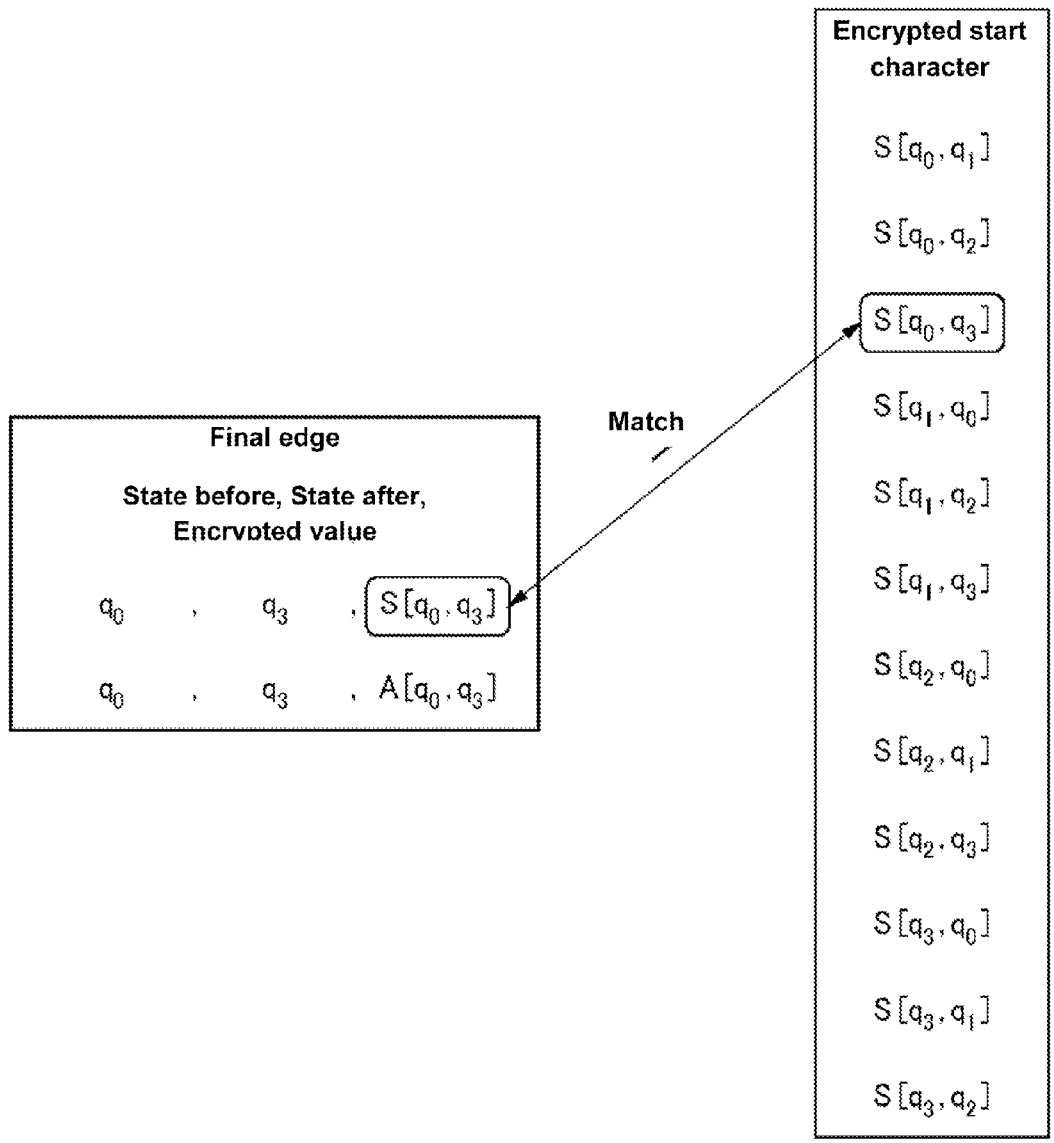
FIG. 30 shows an example of encrypted starting characters that match an encryption value included in a final edge.

FIG. 28 shows the flow for determination processing in step S50. FIG. 29 shows an example of the processing in step S52 and step S53. FIG. 30 shows an example of the determination processing in step S56.

The authentication system 10 executes the processing for the following step S51 through step S56 for determination processing in step S50.

First, in step S51, the server 20 extracts the start character in the context-free grammar. In the present example, "S" is extracted as the start character from the context-free grammar.

Next, in step S52, the server 20 expands the extracted start in correspondence with a plurality of determined transition patterns on the basis of the plurality of states of the automaton. Furthermore, the server 20 assigns states before and states after to the each of the start characters that have been expanded according to the corresponding transition patterns. In other words, the server 20 assigns the state of the transition origin for the corresponding transition pattern as the state before and assigns the transition destination for the corresponding transition pattern as the state after for each start character that has been expanded. In the present example, as is shown in FIG. 29, the server 20 expands to 12 production rules for the start character of "S" and assigns a state before and state after.

Next, in step S53, the server 20 generates an encrypted start character in which the expanded start character is made to correspond with the assigned state before and state after an encrypted by a predetermined encryption formula. Moreover, here, the server 20 generates an encrypted value in which encryption is carried out by the same encryption formula as the encryption formula executed in step S23, step S33, and the like. In the present example, as shown in FIG. 29, the server 20 encrypts the start character S by making a correspondence with the state before and state after.

Next, in step S54, the client 30 extracts the edge that represents the transition from the initial state to the final state in the automaton out of the plurality of the edge is included in the edge set as the final edge. In the present example, the initial state is $q_0$ and the final state is $q_3$; therefore, the client 30 extracts ($q_0, q_3, S[q_0, q_3]$) and ($q_0, q_3, A[q_0, q_3]$) as the final edge.

Next, in step S55, the server 20 and the client 30 compare the encrypted value included in the final edge stored by the server 20 and each of the plurality of encrypted start characters stored by the client 30 by communications carried out using the secure set intersection protocol. In other words, the server 20 and the client 30 compare the encrypted value included in the final edge and each of the plurality of encrypted start characters in a state in which the plurality of encrypted start characters are hidden from the client 30 and the encrypted value included in the final edge is hidden from the server 20.

Next, in step S56, when the encrypted value included in the final edge matches some encrypted start character such as true, the client 30 determines that the automaton satisfies the context-free grammar. In addition, when the encrypted value included in the final edge does not match any encrypted start character such as false, the client 30 determines that the automaton does not satisfy the context-free grammar. In the present example, as is shown in FIG. 30, the encrypted value $S[q_0, q_3]$ matches; therefore, the client 30 determines that the automaton satisfies the context-free grammar.

According to this processing above, the authentication system 10 can determine whether or not the automaton satisfies the context-free grammar in a state in which the context-free grammar held by the server 20 is hidden from the client 30 and the automaton held by the client 30 is hidden from the server 20.

Figure 31:
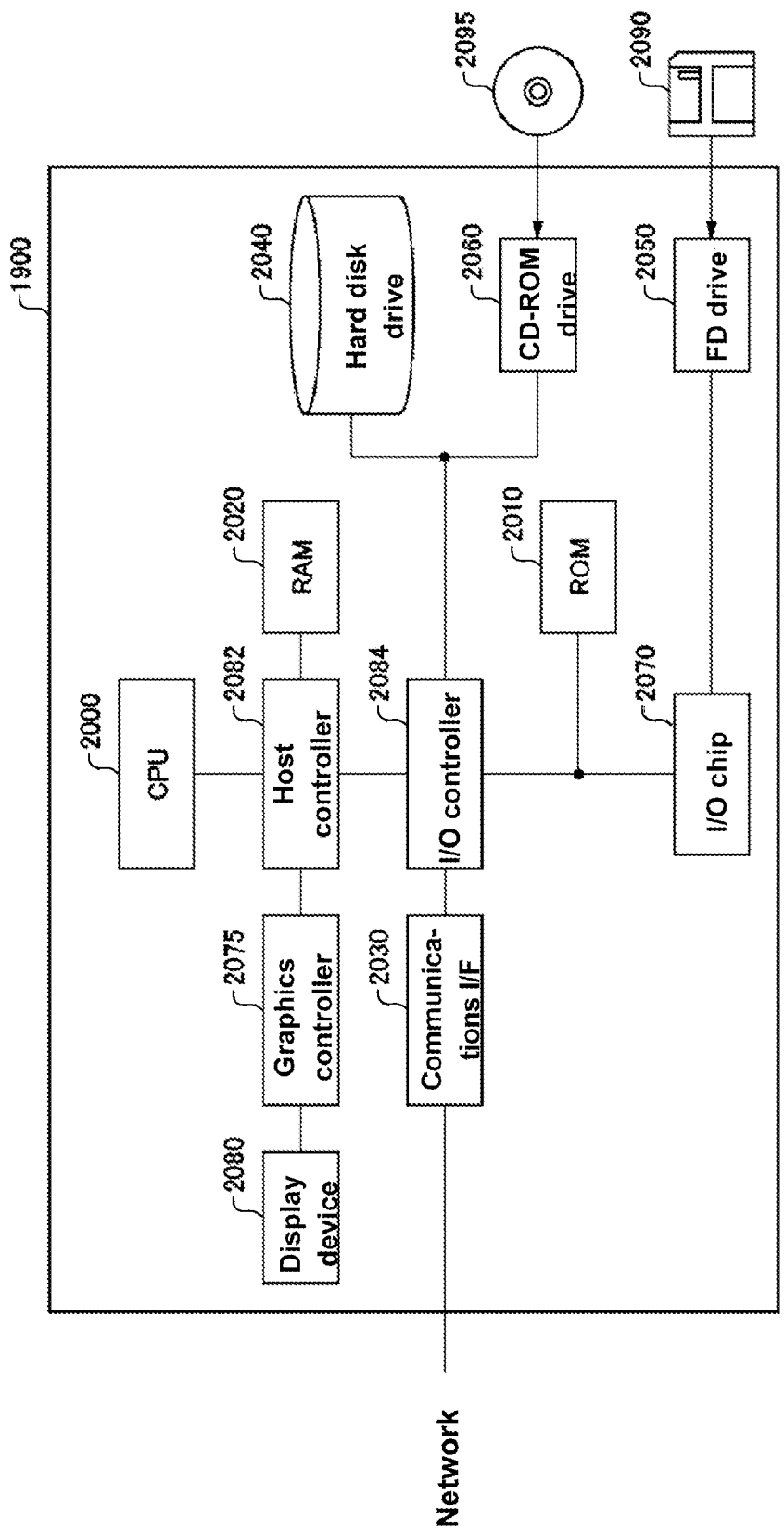
FIG. 31 shows an example of a computer 1900 hardware configuration according to an embodiment of the present invention.

FIG. 31 shows an example of a computer 1900 hardware configuration according to the present embodiment. The computer 1900 according to the present embodiment comprises: a CPU peripheral section having a CPU 2000, RAM 2020, graphics controller 2075, and display device 2080 connected by a host controller 2082; an input-output section having a communications interface 2030, a hard disk drive 2040, and a CD-ROM drive 2060 connected to the host controller 2082 by an input/output controller 2084; and a legacy output section having ROM 2010, a flexible disk drive 2050, and an output chip 2070 connected to the input/output controller 2084.

The host controller 2082 connects the RAM 2020, the CPU 2000 that accesses the RAM 2020 at a high transfer rate, and the graphics controller 2075. The CPU 2000 operates on the basis of a program stored in the ROM 2010 and the RAM 2020 and controls the various sections. The graphics controller 2075 acquires image data the CPU 2000 and the like generates in a frame buffer provided in the RAM 2020 and displays it on the display device 2080. As a substitute for this, the graphics controller 2075 can internally include the frame buffer that stores the image data generated by the CPU 2000 and the like.

The input/output controller 2084 connects the host controller 2082 and the communications interface 2030, which is a comparatively high speed input/output device, the hard disk drive 2040 and the CD-ROM drive 2060. The communications interface 2030 communicates with other devices through a network. The hard disk drive 2040 stores the programs and data that the CPU 2000 in the computer 1900 uses. The CD-ROM drive 2060 reads programs and data from a CD-ROM 2095, and provides the same to the hard disk drive 2040 via the RAM 2020.

In addition, the ROM 2010 and the comparatively low speed input/output devices such as the flexible disk drive 2050 and the input/output chip 2070 are connected in the input/output controller 2084. The ROM 2010 stores a boot program that is executed during startup of the computer 1900 and/or programs and the like that depend on the hardware of the computer 1900. The flexible disk drive 2050 reads programs or data from a flexible disk 2090, and provides the same to the hard disk drive 2040 via the RAM 2020. The input/output chip 2070 connects the flexible disk drive 2050 to the input/output controller 2084 and also connects, for example, various input/output devices through a parallel port, serial port, keyboard port, mouse support, and the like to the input/output controller 2084.

The programs provided to the hard disk drive 2040 via the RAM 2020 are stored by a user in storage media such as the flexible disk 2090, CD-ROM 2095, an IC card or the like. The programs are read from the storage media, install on the hard disk drive 2040 in the computer 1900 via the RAM 2020 and executed in the CPU 2000.

The programs that are installed in the computer 1900 and make the computer 1900 function as the server 20 comprise a state receiving module, context-free grammar storage module, expansion module, left-hand term processing module, right-hand term processing module, start character processing module, and sending module. These programs and modules operate respectively on the CPU 2000 and the like and make the computer 1900 function as the state receiving section 42, context-free grammar storage section 44, expansion section 46, left-hand term processing section 48, right-hand term processing section 50, start character processing section 52, and sending section 54.

By being read into the computer 1900, the information processing described in these programs function as the state receiving section 42, context-free grammar storage section 44, expansion section 46, left-hand term processing section 48, right-hand term processing section 50, start character processing section 52, and sending section 54, which are specific means in which the software and previously described various types of hardware resources work cooperatively. Furthermore, by these specific means, a server 20 specific to the purpose for use can be constructed by implementation of calculations or processing of information according to the purpose for use of the computer 1900 in the present embodiment.

Programs that are installed in the computer 1900 and make the computer 1900 function as the client 30 comprise an automaton generating module, automaton storage module, state sending module, initial edge generating module, edge set storage module, edge pair generating module, final edge extraction module, receiving module, and adding module. These programs and modules respectively work on the CPU 2000 and the like, and make the computer 1900 work as the automaton generating section 62, automaton storage section 64, state sending section 66, initial edge generating section 68, edge set storage section 70, edge pair generating section 72, final edge extraction section 74, receiving section 76, and adding section 78.

By being read into the computer 1900, the information processing described in these programs function as the automaton generating section 62, automaton storage section 64, state sending section 66, initial edge generating section 68, edge set storage section 70, edge pair generating section 72, final edge extraction section 74, receiving section 76, and adding section 78, which are specific means in which the software and previously described various types of hardware resources work cooperatively. Furthermore, by these specific means, a client 30 specific to the purpose for use can be constructed by implementation of calculations or processing of information according to the purpose for use of the computer 1900 in the present embodiment.

As an example, when communication is carried out between the computer 1900 and external devices and the like, a communications program that loads into the CPU 2000 and RAM 2020 is executed, and instructions are given for communications processing for the communications interface 2030 on the basis of the processing details described in the communications program.

The communications interface 2030 is controlled by the CPU 2000, reads and sends to the network the data to be sent that is stored in a send buffer region or the like provided on the RAM 2020, hard disk drive 2040, flexible disc 2090, CD-ROM 2095, or other storage device or writes received data received from the network to a receiving buffer region or the like on a storage device. Thus, the communications interface 2030 can also transfer sending and received data between storage devices by direct memory access (DMA); alternatively, the CPU 2000 reads off data from a storage device which is the source of the transfer or from the communications interface 2030 and transfers the sent or received data to the destination communications interface 2030 or storage device.

In addition, the CPU 2000 reads all are the necessary parts from files, databases or the like stored in the hard disk drive 2040, CD-ROM drive 2060 (CD-ROM 2095), flexible disk drive 2050 (flexible disc 2090), or other external storage device into the RAM 2020 by DMA transfer or the like and carries out various types of processing on the data in the RAM 2020. Furthermore the CPU 2000 rights the data that has been processed back to the external storage device by DMA transfer or the like. In this processing, the RAM 2020 only holds the content of the external storage device temporarily; therefore, in the present embodiment, the RAM 2020 and the external storage devices and the like are called memory, storage sections, storage devices, or the like. The various types of information such as the various programs, data, tables, databases in the present embodiment are stored in these storage devices and are the objects of information processing. Moreover, parts of the CPU 2000 and rammed 2020 are held in cache memory, reading and writing can also be carried out in the cache memory. In this configuration, the cache memory also assumes part of the function for the RAM 2020; therefore, in the present embodiment, the cache memory is also included in the RAM 2020, memory, and/or storage devices except in cases when shown separately.

In addition, the CPU 2000 carries out various types of processing including various types of calculations, processing of information, conditional judgment, searching and replacing information, and the like that are indicated by sequences of instructions in the programs and are described in the present embodiment on the data read from the RAM 2020 and writes back to the RAM 2020. For example, when a conditional judgment is made, the CPU 2000 compares various variables shown in the present embodiment with other variables or constants, determines whether they satisfy conditions such as greater, less, greater than or equal, less than or equal, equal or the like and branches to other sequences of instructions or call subroutines when conditions are established or more when not established.

In addition, the CPU 2000 can search for information stored in files or databases in the storage devices. For example, when a plurality of entries each making a correspondence between an attribute value for a first attribute and an attribute value for a second attribute is stored in a storage device, the CPU 2000 searches for an entry in which an attribute value for the first attribute matches the conditions indicated among the plurality of entries stored in the storage device, reads the attribute value for the second attribute stored in that entry, and thereby can obtain the attribute value for the second attribute corresponding to the first attribute satisfying prescribed conditions.

The programs or modules shown above can be stored in external storage media. Besides the flexible disk 2090 and CD-ROM 2095, an optical storage medium such as a DVD, CD, or the like, a magnetic storage medium such as an MO, tape media, a semiconductor medium such as an IC card, or the like can be used for the storage medium. In addition, a hard disk, ramble or other storage device provided in a server system connected to a dedicated communications network or the Internet can be used for the storage medium and provide programs to the computer 1900 via the network.

A description was given above using an embodiment of the present invention, but the technical scope of the present invention is not limited to the scope described in the embodiment described above. It is apparent to someone skilled in the art that it is possible to add various changes or improvements to the embodiment described above. It is apparent from the descriptions in the claims that configurations adding such changes or improvements can be included in the technical scope of the present invention.

It should be understood that order of execution of the various processes in the operations, procedures, steps, stages, and the like for the devices, systems, programs, and methods in the scope of the claims, description, and drawings, does not clearly indicate specific stages of "before", "in advance of", and the like and can be executed in any order unless the output of previous processing is used in subsequent processing. In the flow of operations in the claims, description, and drawings, "first", "next", and the like are used for convenience in the descriptions and do not signify that implementation must be carried out in this order.

The invention claimed is:

1. A server that holds context-free grammar and is connectable to a client that holds an automaton, the server performing the steps of:

comparing an edge pair with an encrypted string value such that the encrypted string value is hidden from the client;

wherein the edge pair represents a string for an encrypted value in which a nonfinal character is made to correspond to a state before and a state after held by the client;

wherein the encrypted string value that represents a string for an encrypted value in which each of a plurality of nonfinal characters included in a substituted symbol string for a production rule for the context-free grammar is given correspondence with an assigned state before and state after;

sending the encrypted value in which the encrypted string value is made to correspond to a state before and a state after to which substitution symbols for a production rule in which the encrypted string value matches the edge pair to the client along with the assigned state before and state after;

executing an expanding step in the second computer for expanding each of the plurality of production rules in the context-free grammar into a plurality according to a plurality of transition patterns;

assigning a state before and state after corresponding to the transition patterns, which correspond to nonfinal characters included in each of the production rules that has been expanded;

executing a left-hand term processing step in the second computer for generating the encrypted value in which a substitution symbol is encrypted with correspondence made to the state before;

assigning the state after that for each of the plurality of production rules that has been expanded;

generating an encrypted string value in a right-hand term processing step that represents a string of encrypted values in which each of a plurality of nonfinal characters included in the substituted symbol string are encrypted with correspondence made to the state before in state after there have been assigned for each of the plurality of production rules after expansion;

executing an edge set storage step in the first computer for storing edge sets that include a plurality of edges expressing state transitions in the automaton;

executing an edge pair generating step in the first computer for selecting a plurality of edges that can undergo continuous transition from the edge set and generating edge pairs that represent strings of encrypted values that include the plurality of selected edges;

executing a sending step in the first computer and the second computer for comparing the edge pairs representing strings of encrypted values in which nonfinal characters have been encrypted with correspondence made to the state before and state after and the encrypted string values corresponding to each of the plurality of production rules after expansion;

hiding the encrypted string values from the second computer and comparing; and hiding the edge pairs from the second computer.

2. The server of claim 1, wherein the server comprises:

an expansion section that expands each of a plurality of production rules in the context-free grammar into a plurality corresponding to a plurality of transition patterns and assigns a state before and a state after two nonfinal characters included in each of the production rules that has been expanded according to a transition pattern;

a left-hand term processing section that generates an encrypted value in which a substitution symbol is encrypted with correspondence made with the state before and state after assigned for each of the plurality of production rules that has been expanded;
a right-hand term processing section that generates an encrypted string value that represents a string of encrypted values that have been encrypted with correspondence with the state before and state after assigned to each of a plurality of nonfinal characters included in a substituted symbol string for each of the plurality of production rules after the expansion; and
a sending section that compares the edge pairs held by the client and the encrypted string values corresponding to each of the plurality of production rules after the expansion, hiding the encrypted string values from the client, and sends the encrypted values in which substitution symbols for production rules in which the encrypted string values that match an edge pair are encrypted to the client along with the state before and state after that have been assigned.

3. The server of claim 2 wherein the client comprises:
an edge set storage section that stores edge sets that include a plurality of edges representing state transitions in the automaton;
an edge pair generating section that generates edge pairs that represent strings of encrypted values that include a plurality of edges that have been selected;
a receiving section that compares the edge pairs and the encrypted string values corresponding to each of the plurality of production rules after the expansion, hiding the edge pairs from the server and receives encrypted values in which the substitution symbols for production rules in which the encrypted string values that match an edge pair are encrypted from the server along with the state before and state after that have been assigned; and
an adding section that adds the groups of states before, states after, and encrypted values that have been received to the edge set as new edges.

4. The server of claim 3 wherein the expansion section carries out the steps of:
extracting the production rules in which the substituted symbol strings are the null character out of the plurality of production rules in the context-free grammar;
expanding the extracted production rules in correspondence with each state for the automaton, and assigns the same state before and state after to the substitution symbol for each of the production rules that have been expanded;
the receiving section receives the encrypted values in which the substitution symbols for production rules in which the substituted symbol string is the null character are encrypted along with the assigned state before and state after; and
the adding section adds groups of the state before, state after, and encrypted value that have been received to the edge set as new edges.

5. The server of claim 4 wherein the edge storage section carries out the steps of:
storing in initial edges representing the groups of the state before, state after and input characters in correspondence with each of the plurality of state transitions in the automaton;
extracting the production rules by the expansion section in which the substituted symbol string is nonfinal characters out of the plurality of production rules in the context-free grammar;
expanding the extracted production rules making correspondence with the plurality of transition patterns determined on the basis of the plurality of states in the automaton;
assigning a state before and state after according to the transition pattern that corresponds with the substitution symbol for each of the production rules that has been expanded;
receiving the encrypted values by the receiving station in which substitution symbols for production rules in which the final character matches the input character included in some initial edge and the state before and state after assigned to the substitution symbol match the state before and state after included in that initial edge along with the state before and state after assigned; and
adding the groups of state before, state after, and encrypted value by the adding station that have been received to the edge set as new edges.

6. The server of claim 5 wherein the server holds context-free grammar in which the production rules are represented by Chomsky normal forms.

7. The server of claim 6 wherein the expansion section carries out the steps of:
extracting the production rules in which the substituted symbol strings are two nonfinal characters out of the plurality of production rules in the context-free grammar;
expanding the production rules extracted according to a plurality of transition patterns determined on the basis of the plurality of the states in the automaton;
assigning a state before and state after according to a transition pattern that corresponds to each of the nonfinal characters included in each of the production rules that have been expanded; and
encrypting each of the nonfinal characters included in the substituted symbol string for each of the plurality of production rules by the right-hand term processing section after expansion and generates the encrypted string values.

8. The server of claim 7, wherein the edge pair generating section carries out the steps of:
selecting two edges that can undergo a continuous transition from the edge set;
forming a scalar value by substituting the encrypted values included in each of the two edges selected into a function;
generating an edge pair;
forming a scalar value by the right-hand term processing section through substituting each of the encrypted values for the two nonfinal characters into the function; and
generating an encrypted string value for the production rules in which the substituted symbol string is a string of two nonfinal characters.

9. The server of claim 7, wherein the receiving section further carries out the step of:
comparing the edge pair and the encrypted string values corresponding to each of the plurality of production rules after expansion when the adding section has added a new edge and receives encrypted values in which the substitution symbols for production rules in which the encrypted string values match edge pairs are encrypted from the server.

10. The server of claim 9, wherein the expansion section extracts a start character in the context-free grammar carries out the steps of:

expanding the extracted start character making correspondence with a plurality of transition patterns determined on the basis of the plurality of states in the automaton;

assigning a state before and state after according to the transition pattern corresponding to each of the start characters that has been expanded;

providing the server with a start character processing section that generates encrypted start characters in which each of the plurality of start characters that has been expanded is encrypted is encrypted with correspondence made to the state before and state after that has been assigned;

providing the client with a final edge extraction section that extracts edges representing transitions from the initial state in the automaton to the final state out of the plurality of edges included in the edge set as final edges;

comparing the encrypted values by the sending section and receiving section that include the final edges and the encrypted start characters in a state in which the final edges are hidden from the server and the encrypted start characters are hidden from the client; and determining by the receiving section that the automaton satisfies the context-free grammar when an encrypted value included in a final edge matches the encrypted start character.

11. The server of claim 3, wherein the sending section and the receiving section carries out the steps of:

comparing the edge pairs and the encrypted string values corresponding to each of the plurality of production rules after expansion;

hiding the encrypted string values from the client; and hiding the edge pairs from the server according to a secure set intersection protocol.

12. The server of claim 3, wherein the client is further provided with an automaton generating section that inputs a string and generates an automaton that represents the string that has been input.

13. A client connectable to server of claim 1 and holds an automaton, the client comprising:

an edge set storage section that stores edge sets that include a plurality of edges representing state transitions in the automation;

an edge pair generating section that generates edge pairs that represent strings of encrypted values that include a plurality of edges that have been selected;

a receiving section that compares the edge pairs and the encrypted string values corresponding to each of the plurality of production rules after the expansion, hiding the edge pairs from the server and receives encrypted values in which the substitution symbols for production rules in which the encrypted string values that match an edge pair are encrypted from the server along with the state before and state after that have been assigned; and an adding section that adds the groups of states before, states after, and encrypted values that have been received to the edge set as new edges.

14. A computer readable storage medium device tangibly embodying a computer readable program code having computer readable instructions which, when implemented, cause a computer to function as the server that holds context-free grammar and is connectable to a client that holds an automaton, the server performing the steps of:

comparing an edge pair with an encrypted string value such that the encrypted string value is hidden from the client;

wherein the edge pair represents a string for an encrypted value in which a nonfinal character is made to correspond to a state before and a state after held by the client;

wherein the encrypted string value that represents a string for an encrypted value in which each of a plurality of nonfinal characters included in a substituted symbol string for a production rule for the context-free grammar is given correspondence with an assigned state before and state after;

sending the encrypted value in which the encrypted string value is made to correspond to a state before and a state after to which substitution symbols for a production rule in which the encrypted string value matches the edge pair to the client along with the assigned state before and state after;

executing an expanding step in the second computer for expanding each of the plurality of production rules in the context-free grammar into a plurality according to a plurality of transition patterns;

assigning a state before and state after corresponding to the transition patterns, which correspond to nonfinal characters included in each of the production rules that has been expanded;

executing a left-hand term processing step in the second computer for generating the encrypted value in which a substitution symbol is encrypted with correspondence made to the state before;

assigning the state after that for each of the plurality of production rules that has been expanded;

generating an encrypted string value in a right-hand term processing step that represents a string of encrypted values in which each of a plurality of nonfinal characters included in the substituted symbol string are encrypted with correspondence made to the state before in state after there have been assigned for each of the plurality of production rules after expansion;

executing an edge set storage step in the first computer for storing edge sets that include a plurality of edges expressing state transitions in the automaton;

executing an edge pair generating step in the first computer for selecting a plurality of edges that can undergo continuous transition from the edge set and generating edge pairs that represent strings of encrypted values that include the plurality of selected edges;

executing a sending step in the first computer and the second computer for comparing the edge pairs representing strings of encrypted values in which nonfinal characters have been encrypted with correspondence made to the state before and state after and the encrypted string values corresponding to each of the plurality of production rules after expansion;

hiding the encrypted string values from the second computer and comparing; and hiding the edge pairs from the second computer.

15. A computer readable storage device tangibly embodying a computer readable program code having computer readable instructions which, when implemented, cause a computer to function as the server that holds context-free grammar and is connectable to a client that holds an automaton, the server performing the steps of:

comparing the edge pairs and the encrypted string values; and hiding the edge pairs from the server, and receives encrypted values in which substitution symbols for production rules in which the encrypted string values match edge pairs are encrypted with correspondence made to the assigned state before in state after along with the states before and states after that have been assigned comparing an edge pair with an encrypted string value such that the encrypted string value is hidden from the client;

wherein the edge pair represents a string for an encrypted value in which a nonfinal character is made to correspond to a state before and a state after held by the client;

wherein the encrypted string value that represents a string for an encrypted value in which each of a plurality of nonfinal characters included in a substituted symbol string for a production rule for the context-free grammar is given correspondence with an assigned state before and state after;

sending the encrypted value in which the encrypted string value is made to correspond to a state before and a state after to which substitution symbols for a production rule in which the encrypted string value matches the edge pair to the client along with the assigned state before and state after;

executing an expanding step in the second computer for expanding each of the plurality of production rules in the context-free grammar into a plurality according to a plurality of transition patterns;

assigning a state before and state after corresponding to the transition patterns, which correspond to nonfinal characters included in each of the production rules that has been expanded;

executing a left-hand term processing step in the second computer for generating the encrypted value in which a substitution symbol is encrypted with correspondence made to the state before;

assigning the state after that for each of the plurality of production rules that has been expanded;

generating an encrypted string value in a right-hand term processing step that represents a string of encrypted values in which each of a plurality of nonfinal characters included in the substituted symbol string are encrypted with correspondence made to the state before in state after there have been assigned for each of the plurality of production rules after expansion;

executing an edge set storage step in the first computer for storing edge sets that include a plurality of edges expressing state transitions in the automaton;

executing an edge pair generating step in the first computer for selecting a plurality of edges that can undergo continuous transition from the edge set and generating edge pairs that represent strings of encrypted values that include the plurality of selected edges;

executing a sending step in the first computer and the second computer for comparing the edge pairs representing strings of encrypted values in which nonfinal characters have been encrypted with correspondence made to the state before and state after and the encrypted string values corresponding to each of the plurality of production rules after expansion;

hiding the encrypted string values from the second computer and comparing; and hiding the edge pairs from the second computer.

16. A method for determining whether the automaton satisfies the context-free grammar by a first computer holding the automaton and a second computer holding the context-free grammar, the method comprising:

comparing an edge pair with an encrypted string value such that the encrypted string value is hidden from the second computer;

comparing so that the edge pair is hidden from the second computer, wherein the edge pair represents a string for an encrypted value in which a nonfinal character is made to correspond with a state before and a state after held in the first computer and wherein the encrypted string value that represents a string for an encrypted value in which each of a plurality of nonfinal characters contained in a substituted symbol string for a production rule for the context-free grammar is made to correspond with the assigned state before and state after and encrypted;

sending the encrypted value in which the substitution symbol for a production rule in which the encrypted string value and the edge pair agree is encrypted with correspondence made to the state before and the state after that are assigned to the second computer from the first computer along with the assigned state before and state after;

executing an expanding step in the second computer for expanding each of the plurality of production rules in the context-free grammar into a plurality according to a plurality of transition patterns;

assigning a state before and state after corresponding to the transition patterns, which correspond to nonfinal characters included in each of the production rules that has been expanded;

executing a left-hand term processing step in the second computer for generating the encrypted value in which a substitution symbol is encrypted with correspondence made to the state before;

assigning the state after that for each of the plurality of production rules that has been expanded;

generating an encrypted string value in a right-hand term processing step that represents a string of encrypted values in which each of a plurality of nonfinal characters included in the substituted symbol string are encrypted with correspondence made to the state before in state after there have been assigned for each of the plurality of production rules after expansion;

executing an edge set storage step in the first computer for storing edge sets that include a plurality of edges expressing state transitions in the automaton;

executing an edge pair generating step in the first computer for selecting a plurality of edges that can undergo continuous transition from the edge set and generating edge pairs that represent strings of encrypted values that include the plurality of selected edges;

executing a sending step in the first computer and the second computer for comparing the edge pairs representing strings of encrypted values in which nonfinal characters have been encrypted with correspondence made to the state before and state after and the encrypted string values corresponding to each of the plurality of production rules after expansion;

hiding the encrypted string values from the second computer and comparing; and hiding the edge pairs from the second computer.

17. The method according to claim 16, comprising:

sending encrypted values in which the substitution symbols for production rules in which the encrypted string values agree with the edge pairs from the second computer to the first computer along with the state before and state after that have been assigned.

18. The method according to claim 17 comprising:

adding the groups of state before, state after, and encrypted value that have been received to the edge set as new edges.

* * * * *